United States Patent
Youn et al.

(10) Patent No.: US 10,901,476 B2
(45) Date of Patent: Jan. 26, 2021

(54) METHOD FOR PREDICTING POWER DEMAND AND CONTROLLING ESS CHARGE/DISCHARGE BASED ON THE PREDICTED DEMAND, AND APPARATUS USING THE SAME

(71) Applicant: DOOSAN HEAVY INDUSTRIES & CONSTRUCTION CO., LTD., Changwon-si (KR)

(72) Inventors: Ju Young Youn, Yongin-si (KR); Sung Ku Park, Yongin-si (KR); Young Hoon Rhie, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 130 days.

(21) Appl. No.: 16/018,053

(22) Filed: Jun. 26, 2018

(65) Prior Publication Data

US 2019/0011970 A1   Jan. 10, 2019

(30) Foreign Application Priority Data

Jul. 6, 2017   (KR) .................. 10-2017-0086124
Mar. 26, 2018   (KR) .................. 10-2018-0034443

(51) Int. Cl.
  *G06F 1/28*   (2006.01)
  *G06F 1/26*   (2006.01)
  (Continued)

(52) U.S. Cl.
  CPC ............... *G06F 1/28* (2013.01); *G06F 1/263* (2013.01); *G06F 1/3212* (2013.01);
  (Continued)

(58) Field of Classification Search
  None
  See application file for complete search history.

(56) References Cited

U.S. PATENT DOCUMENTS

| 7,802,120 B2 * | 9/2010 | Conroy ..................... G06F 1/26 713/340 |
| 2013/0093393 A1 * | 4/2013 | Shimotani .......... G01C 21/3469 320/109 |

(Continued)

FOREIGN PATENT DOCUMENTS

| JP | 2017228148 A | 12/2017 |
| KR | 10-2014-0067654 A | 6/2014 |

(Continued)

OTHER PUBLICATIONS

English translation of a Korean Office Action dated Jun. 24, 2019 in connection with Korean Patent Application No. 10-2018-0034443.

*Primary Examiner* — Robert A Cassity
(74) *Attorney, Agent, or Firm* — Invenstone Patent, LLC

(57) ABSTRACT

A method for predicting consumer power demand uses power consumption data measured over a long term and a power usage pattern immediately before a target time and for controlling ESS charge/discharge of an ESS based on the predicted power demand. A power demand prediction apparatus using the method includes respective components for collecting weather data and data on power used by the consumer; selecting data points according to a preset condition from among data collected by the data collector based on a specific time span; generating long term prediction data for the power demand in the specific time span based on the selected data points; analyzing a power usage pattern immediately before the specific time span and comparing the power usage pattern with the long-term prediction data, to determine whether prediction data correction is required; and correcting the prediction data based on the power usage pattern when correction is required.

18 Claims, 20 Drawing Sheets

(51) Int. Cl.
*G06N 99/00* (2019.01)
*G06F 1/3212* (2019.01)
G05B 15/02 (2006.01)
G06N 20/00 (2019.01)

(52) U.S. Cl.
CPC .......... G06N 99/005 (2013.01); *G05B 15/02* (2013.01); *G06N 20/00* (2019.01)

(56) References Cited

U.S. PATENT DOCUMENTS

| | | | | |
|---|---|---|---|---|
| 2013/0134940 A1* | 5/2013 | Tominaga | ............. | H02J 7/0071 |
| | | | | 320/109 |
| 2014/0312850 A1* | 10/2014 | Song | ............. | H02J 7/0014 |
| | | | | 320/134 |
| 2015/0039146 A1* | 2/2015 | Wei | ............. | G05B 13/026 |
| | | | | 700/291 |
| 2016/0187395 A1* | 6/2016 | Bodas | ............. | G06F 11/3006 |
| | | | | 702/60 |
| 2016/0335730 A1* | 11/2016 | Loeb | ............. | G06Q 50/06 |
| 2017/0070089 A1* | 3/2017 | Fukubayashi | ............. | H02J 3/32 |
| 2017/0271885 A1* | 9/2017 | Chan | ............. | H02J 7/0003 |
| 2018/0323643 A1* | 11/2018 | Arar | ............. | H02J 3/14 |

FOREIGN PATENT DOCUMENTS

| | | |
|---|---|---|
| KR | 10-2015-0015832 A | 2/2015 |
| KR | 101522858 B1 | 5/2015 |
| KR | 101703296 B1 | 2/2017 |

\* cited by examiner

METHOD FOR PREDICTING POWER DEMAND AND CONTROLLING ESS CHARGE/DISCHARGE BASED ON THE PREDICTED DEMAND, AND APPARATUS USING THE SAME

CROSS REFERENCE TO RELATED APPLICATIONS

The present application claims priority to Korean Patent Application No. 10-2017-0086124, filed Jul. 6, 2017, and to Korean Patent Application No. 10-2018-0034443, filed Mar. 26, 2018, the entire contents of which is incorporated herein for all purposes by this reference.

BACKGROUND OF THE DISCLOSURE

Field of the Disclosure

The present disclosure relates generally to the prediction of a power demand and to the charge/discharge control of an energy storage system (ESS) based on the predicted power demand. More particularly, the present disclosure relates to a method for predicting consumer power demand, using power consumption data measured over a long term and a power usage pattern immediately before a target time, and for controlling charge/discharge of an ESS based on the predicted power demand, to enable the ESS to operate according to a more accurate charge/discharge schedule, and to apparatus using the method.

Description of the Related Art

Global demand for energy is increasing, and environmental issues have brought renewable energy sources to the forefront. These sources include wind, wave, solar and hydro power rather than fossil fuels.

Meanwhile, new forms of renewable energy, used in conjunction with a global smart grid, are changing the way power is supplied to consumers. The more traditional method of supplying power unidirectionally, that is, from an energy supplier to an energy consumer, can be combined with a bidirectional method whereby the energy consumer serves as a supplier as well as consumer. Here, the energy consumer may be a large-scale building or other individual consumer of the source-supplied energy, who may supply power to another consumer. A key element in the use of the smart grid and renewable energy sources is an energy storage system (ESS), which allows the energy produced to be stored (charged) and discharged locally, thereby enabling efficient power usage.

However, for efficient ESS charging/discharging, it is necessary to predict the power demand. In particular, in the case of an energy storage system for a particular building, it is necessary to precisely predict the power demand in the building so that a charge/discharge plan for the energy storage system can be accurately established and an increase in energy costs can be prevented. Various power demand prediction methods have been proposed, but current power demand has been mainly predicted using only past data. Prediction accuracy is typically poor or unreliable using such methods, which do not consider such factors as abnormal states of operation and recent power usage patterns.

For example, the power demand prediction performed by a conventional system utilizes past power demand data and maximum power demand information from among recent months to which a time-of-use (TOU) rate plan is applied. Charge/discharge scheduling of the energy storage system is performed so that ESS charging occurs during times of a peak cut rate or within a margin of that rate.

However, such charge/discharge scheduling often fails to meet the power demand at a given point in time, such that the system cannot deal with unexpected peak usage. Further disadvantages include low rates of daily battery usage, and weekend and holiday shutdowns of the energy storage system due to low power demand.

SUMMARY OF THE DISCLOSURE

It is an object of the present disclosure to propose a method for predicting power demand by a consumer such as a building, a plant, and the like, and for controlling charge/discharge of an ESS using the predicted power demand, and apparatus using the method.

According to one aspect of the present disclosure, there is provided a power demand prediction apparatus for predicting power demand of a consumer. The apparatus may include a data collector for collecting weather data and data on power used by the consumer; a data selector for selecting data points according to a preset condition from among data collected by the data collector based on a specific time span for which power demand is to be predicted; a long-term prediction data generator for generating long term prediction data for the power demand in the specific time span based on the selected data points; a power usage pattern analyzer for analyzing a power usage pattern immediately before the specific time span and comparing the power usage pattern with the generated long-term prediction data, to determine whether correction of the long-term prediction data is required; and a prediction data corrector for correcting the long-term prediction data based on the analyzed power usage pattern when the power usage pattern analyzer determines that the correction is required.

The long-term prediction data generator may include a weight setting unit for setting a weight for each selected data point; and a data generating unit for generating the long-term prediction data using a weighted average based on the selected data, in which the weighted average is obtained by dividing a sum of values, obtained by multiplying each data point and the weight set for each data point on all the data, by a sum of the weights set for all data.

The long-term prediction data generator may further include a data arranging unit for calculating a difference between a temperature at the specific time span and a temperature at the time of collecting each selected data point and arranging the selected data points based on the difference. The weight setting unit may set the weight only for a predetermined number of selected data points having the smallest temperature difference from the temperature at the specific time span among the arranged data points, and the data generating unit may generate the long-term prediction data by obtaining a weighted average of the predetermined number of selected data points having the smallest temperature difference from the temperature at the specific time span.

The weight setting unit may set the weight for each selected data point based on a difference between a year corresponding to the specific time span and a year when the selected data is collected.

The weight setting unit may set the weight as 1 when the difference is zero, may set the weight as 0.9 when the difference is one year, may set the weight as 0.8 when the difference is two years, may set the weight as 0.7 when the difference is three years, set the weight as 0.6 when the difference is four years, and may set the weight as 0.5 when the difference is five years.

The power usage pattern analyzer may determine that correction of the long-term prediction data is unnecessary when a line connecting two used power amounts collected at two points of time earlier than the specific time span and a line connecting two long-term prediction power demand amounts at the same point of time generated by the long-term prediction data generation unit cross each other, and determines that correction of the long-term prediction data is necessary when the lines do not cross each other.

The data collector may collect temperature data and used power data at fifteen-minute intervals.

The preset condition may be based on a past date, and the past date may be at least one of a date falling during a time span of fifteen days before and after a date corresponding to the specific time span, and a date similar in type to a date corresponding to the specific time span, in which the type is one of a holiday, a weekend, a weekday, or a date falling between a holiday and another non-working day.

According to another aspect of the present disclosure, there is provided a charge/discharge control apparatus for controlling charge/discharge of a battery of an energy storage system. The apparatus may include a power demand prediction unit for predicting power demand required by a consumer in at least one time span; a charge/discharge time setting unit for setting a charge time range when the battery is charged and a discharge time range when the battery is discharged; a charge scheduling unit for scheduling an amount of power to be supplied for charging the battery for each time span of the charge time range; a discharge scheduling unit for scheduling an amount of power to be discharged from the battery for each time span of the discharge time range; and a control unit for respectively controlling the charging and discharging of the battery as scheduled by the charge scheduling unit and the discharge scheduling unit.

The amount of power to be supplied for charging the battery for each time span of the charge time range may be constant.

The discharge scheduling unit may be provided to discharge all the power charged into the battery in the discharge time range, and discharge an amount of power obtained by subtracting a certain amount of power supplied from a system from the power demand predicted by the power demand prediction unit for each time span to allow an amount of power supplied from the system to be constant.

The discharge scheduling unit may obtain a value of $P_L$ satisfying $$P_B = \Sigma(P_a(n) - P_L)$$

where $P_B$ is an amount of power charged into the battery, $P_a(n)$ is the predicted power demand at each time span, and $P_L$ is an amount of power input from the system. A discharge power $P_o(n)$ at each time span may be obtained using $$P_o(n) = \max(0, P_a(n) - P_L)$$

where the max(A, B) is a function of selecting a larger value of A and B.

According to another aspect of the present disclosure, there is provided a charge/discharge control apparatus. The apparatus may include a power demand prediction unit for predicting power demand of a consumer within a specific period based on past power usage data of the consumer; a charge/discharge time setting unit for establishing a charge/discharge operation schedule of an energy storage apparatus for a day according to the predicted power demand and manages the energy storage apparatus according to the charge/discharge operation schedule; a power demand correcting unit for comparing the predicted power demand with an actual load of the consumer and corrects the predicted power demand when there is a difference of a predefined size; and an operation schedule update unit for updating the charge/discharge operation schedule based on the corrected power demand and a charge/discharge state of the energy storage apparatus.

The power demand prediction unit may include an artificial intelligence engine; and a power demand prediction unit for using the artificial intelligence engine to predict the power demand of the consumer within the specific period via at least one of a prediction algorithm, a statistical technique, a Delphi technique of an artificial intelligence based on the past power usage data, a weather forecast pattern, and a consumer characteristic pattern.

The charge/discharge time setting unit may include an operation scheduling unit for creating the charge/discharge operation schedule of the energy storage apparatus for the day based on the predicted power demand; and a charge/discharge management unit for managing a charge/discharge operation of the energy storage apparatus on the day based on the created charge/discharge operation schedule.

The charge/discharge management unit may manage the charge/discharge operation of the energy storage apparatus based on the updated charge/discharge operation schedule.

The prediction algorithm may include at least one of a reinforcement learning algorithm, a supervised learning algorithm, and a non-supervised learning algorithm.

The power demand correction unit may include an actual load receiver for receiving the actual load of the consumer from a corresponding power system; and a correction generation unit for correcting the predicted power demand when a difference between the predicted power demand and the actual load of the consumer exceeds a reference value.

The power demand correction unit and the operation schedule update unit are repeatedly performed every prescribed time interval.

The updated charge/discharge operation schedule considers a charge/discharge state of a battery included in one of at least two kinds of batteries and at least two rows of parallel structured batteries.

According to the present disclosure, it is possible to increase the accuracy of the power demand prediction by applying the power consumption pattern immediately before predicting the power demand of the consumer.

Further, according to the present disclosure, it is possible to improve the accuracy of the power demand prediction to optimize energy consumption and ESS operation, thereby reducing energy consumption and energy costs.

More specifically, exemplary embodiments of the present disclosure predict future power demand based on data of past power usage by the consumer, correct the predicted power demand based the actual load of the consumer in real time, and update the charge/discharge operation schedule that has been already established considering the corrected power demand and a charge/discharge state. The embodiments achieve the following beneficial effects.

First, embodiments of the present disclosure maximize the usage charge savings to the consumer by increasing a daily battery usage compared to existing technology, and can lower the peak cut of the consumer, thereby maximizing the basic charge savings to the consumer.

Second, embodiments of the present disclosure enable the energy storage system to operate on weekends, holidays, and during other downtimes typical of contemporary systems, so that daily battery usage can be maximized.

Third, embodiments of the present disclosure can deal with unexpected peaks, thereby reducing the basic charge.

Fourth, embodiments of the present disclosure combine at least two kinds of or at least two rows of parallel structured batteries having different charging periods and output characteristics, maximizing the operating efficiency of each battery through improved charge/discharge scheduling efficiency and a reduced peak cut, thereby reducing the base and usage charges.

The present disclosure is not limited to the above-mentioned effects, and other effects not mentioned can be clearly understood by those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
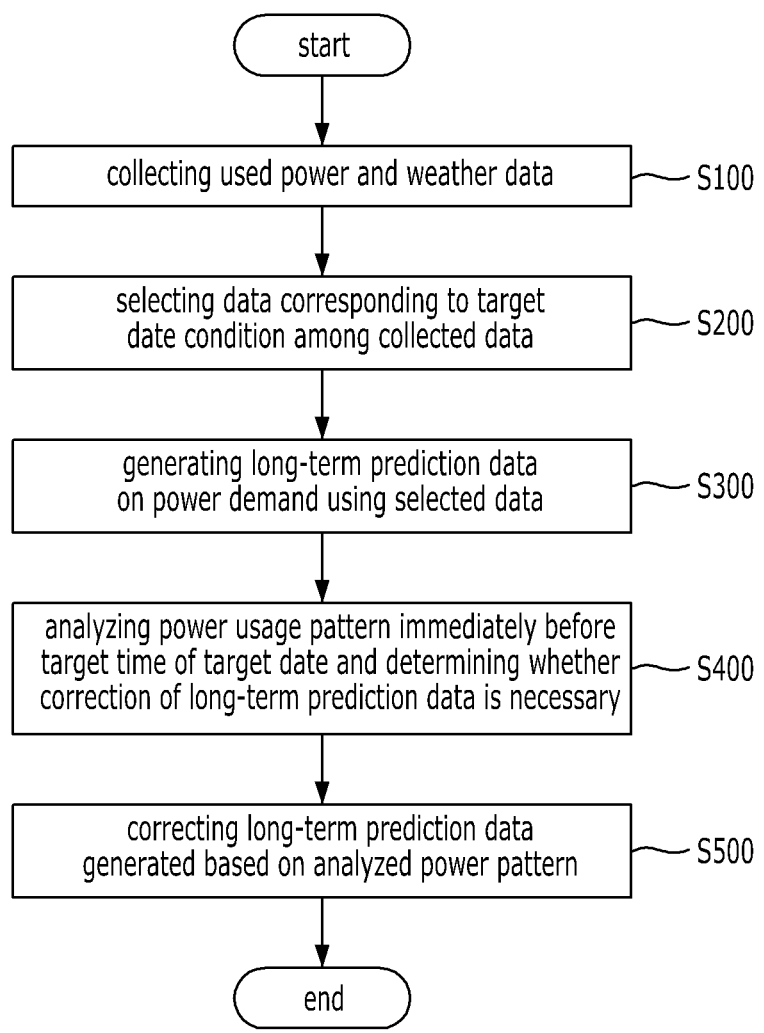
FIG. 1 is a flow diagram of a method of predicting power demand according to an exemplary embodiment of the present disclosure.

In order to clearly illustrate the present disclosure, parts that are not related to the description are omitted, and the same or similar components are denoted by the same reference numerals throughout the specification.

Throughout the specification, when a part is referred to as being "connected" to another part, it includes not only a case of being "directly connected" but also a case of being "electrically connected" with another part in between. Also, when a part is referred to "include" a component, it is understood that it further includes other elements, not excludes other elements, unless specifically stated otherwise.

When one portion is referred to as being "on" other portion, it may be directly on the other portion or may be involved with another portion in between. In contrast, when one portion is referred to as being "directly on" other portion, no other portion is involved in between.

The terms such as first, second, third, etc. are used to describe various parts, components, regions, layers and/or sections, but are not limited thereto. These terms are only used to distinguish any part, element, region, layer or section from another part, element, region, layer or section. Thus, a first portion, component, region, layer or section described below may be referred to as a second portion, component, region, layer or section without departing from the scope of the present disclosure.

The terms used herein are for the purpose of describing particular variations only and is not intended to be limiting of the disclosure. The singular forms used herein include plural forms unless an opposite meaning is expressed. The term "including" used herein specifies the presence of a particular feature, region, integer, step, operation, element and/or component, but does not preclude the presence or addition of other features, regions, integers, steps, operations, elements, and/or component.

Terms indicating relative space, such as "below", "above", and the like may be used to more easily describe a relationship between one portion and other portion shown in the figures. These terms are intended to include alternative functions or acts of the apparatus in use, as well as those intended in the figures. For example, when inverting a device in the figures, certain portions described as being "below" other portions are described as being "above" the other portions. Thus, an exemplary term "below" includes both up and down directions. The apparatus can be rotated 90 degrees or rotated at different angles, and the term indicating the relative space is interpreted accordingly.

Unless defined otherwise, all terms including technical and scientific terms used herein have the same meaning as commonly understood by one of ordinary skill in the art. Commonly used predefined terms are further interpreted as having a meaning consistent with the relevant technical literature and the present disclosure, and are not to be construed as ideal or very formal meanings unless defined otherwise.

Hereinafter, variations of the present disclosure will be described in detail with reference to the accompanying drawings so that those skilled in the art can easily carry out the present disclosure. The present disclosure may be embodied in many different forms and should not be construed as limited to the variations set forth herein.

FIG. 1 illustrates a method of predicting power demand according to an embodiment of the present disclosure.

Referring to FIG. 1, in order to predict power demand at a specific target date in a consumer such as a factory or a building, power used in the past and weather data are first collected (S100). The data collection method may collect power and weather data for at least one day to several years at fifteen-minute intervals. Here, the weather data may include an average temperature.

Next, the past data having a condition similar to that of the specific target date to be predicted is selected (S200). Since temperature-sensitive power consumption characteristics should be similar for similar weather conditions occurring around (e.g., plus or minus fifteen days) the same date of other years, the selected data may be data collected from a prior year for a day corresponding to a date near the target date. Data may be further selected based on whether the specific target date is a holiday, a weekend, a weekday, or a date falling between a holiday and another non-working day. That is, similar or analogous conditions may be factored into the selection of data. For example, in the case of an office building or a factory, since an amount of used power may vary greatly depending on whether the target date is a holiday, data from a date of a prior year having similar characteristics may be selected from among the collected data.

For example, assuming a target date for which the power demand is to be predicted is June 15 and a weekday, data collected on weekday dates from May 31 to June 30 may be selected from among the collected data, as data of a date having conditions similar to that of the specific target date. In doing so, about twenty days of data can be selected for any year.

Figure 2:
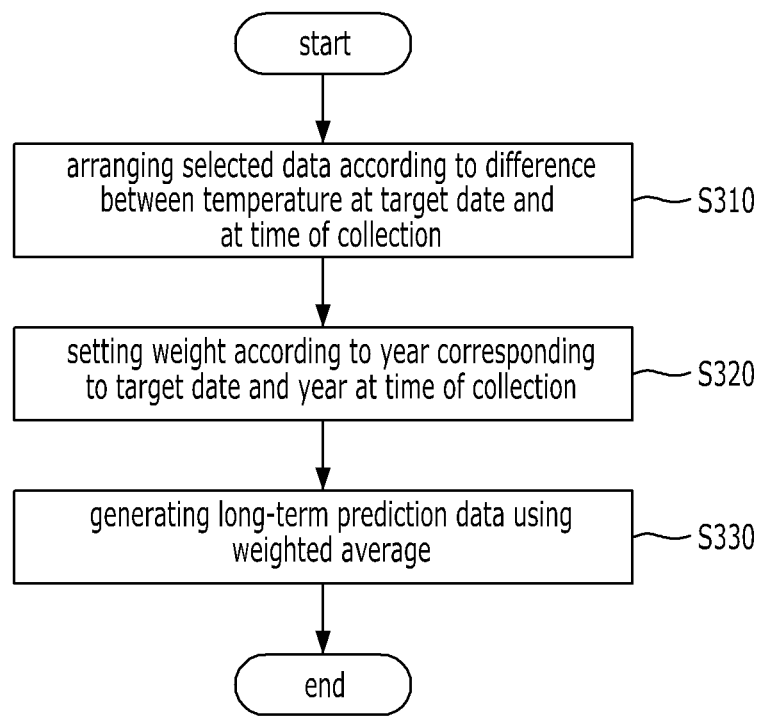
FIG. 2 is a flow diagram of a process of generating long-term prediction data of the power demand on a specific target date based on data selected according to step S200 of FIG. 1.

Based on the selected data, the long-term prediction data on the power demand of the specific target date may be generated (S300). FIG. 2 shows the steps for generating long-term prediction data as in step S300 of FIG. 1, which uses the data selected in step S200, according to an embodiment of the present disclosure.

Referring to FIG. 2, a process of generating the long-term prediction data first calculates a difference between an expected temperature of the target day and temperature at the time of collection of each selected data point, and arranges the selected data in order of increasing temperature difference (S310). Here, it is possible to arrange all the data for a day using a daily average temperature, whereas it is also possible to arrange the data for each time span based on temperature at a point of time when each data point is collected. For example, when data is stored at an interval of fifteen minutes as described above, a total of 96 data points on used power and temperature may be collected from 00:00 to 23:45 for a day. Then, when arranging data for each time span, an amount of calculation increases 96 times as compared with arranging the data of one day at a time.

Then, a weight for the selected data may be set (S320). In one embodiment, the weight may be set based on a difference between a corresponding year of the target date and a year in which the selected data is collected. Specifically, the weight may be set as 1 when the year of the target date is the same as the year when the selected data is collected, 0.9 when the difference is one year, 0.8 when the difference is two years, 0.7 when the difference is three years, 0.6 when the difference is four years, and 0.5 when the difference is five years. When the weight is set as in the above example, the data collected in the year closer to the target date is given a higher weight, thereby having more influence on the generated long-term prediction data.

The long-term prediction data on the power demand of the specific target date may be generated using the weighted average (S330). Here, the long-term prediction data $P_a$ may be generated using a weighted average that may be obtained by dividing a sum of values, obtained by multiplying the used power of the selected data and the weights, by a sum of the weights. That is, the weighted average may be obtained by using the following equation.

$$P_a = \frac{\sum P_i \times W_i}{\sum W_i}$$

In the above equation, $P_i$ is the used power included in the selected data and $W_i$ is the weight applied to the selected data. In particular, although the weighted average described above may be obtained based on all the selected data, it is possible to obtain the weighted average using only the top ten data points based on the arranged data in step S310. In other words, the arrangement in step S310 is in order of increasing temperature difference based on the difference between the predicted temperatures at the target date and the temperature at the time of data collection, whereby the long-term prediction data may be accurately generated using only ten data points in which the predicted temperatures at the target date and the temperature at the time of collection are most similar.

The long-term prediction data may include prediction data taken at fifteen-minute intervals from 00:00 to 23:45 of the target date. That is, the prediction data is generated by obtaining a weighted average for each time span, whereby the long-term prediction data may include power demand prediction data indicative of 96 time spans per day.

Referring again to FIG. 1, as described above, the long-term prediction data is generated, and the power usage pattern immediately before the target time of a target date is analyzed so as to correct the long-term prediction data, thereby determining whether correction of the long-term prediction data is necessary (S400). To this end, the actual used power measured at data points of, for example, fifteen and thirty minutes earlier than the current time for which the prediction data was generated, is compared with the long-term prediction data.

FIGS. 3A to 3D show a relationship between the actual used power and the long-term prediction data. In each graph, two adjacent data points establish a line representative of actual used power for a fifteen minute span, that is, between fifteen and thirty minutes earlier than the current time. Similarly, two corresponding data points are for the long-term prediction data.

Figure 3A:
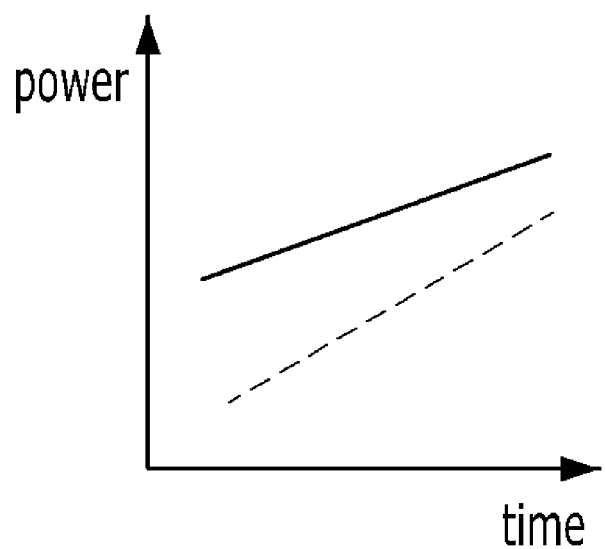
FIGS. 3A to 3D are graphical diagrams illustrating a relationship between actual used power and long-term prediction data.
Figure 3B:
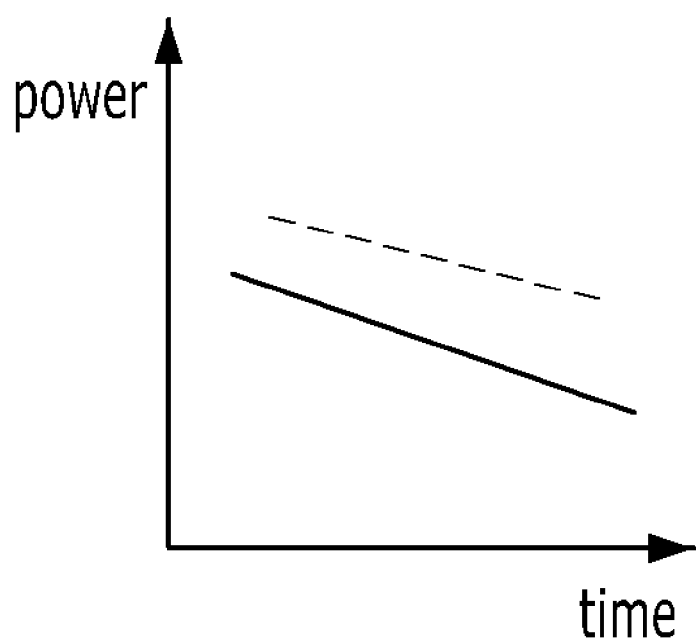
Figure 3C:
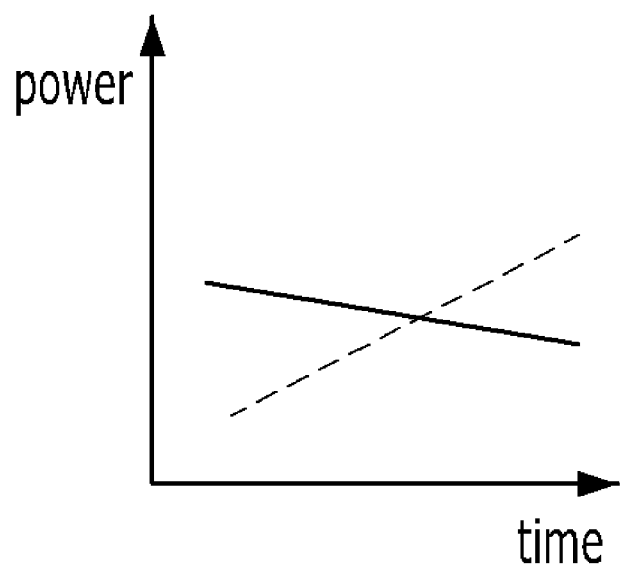
Figure 3D:
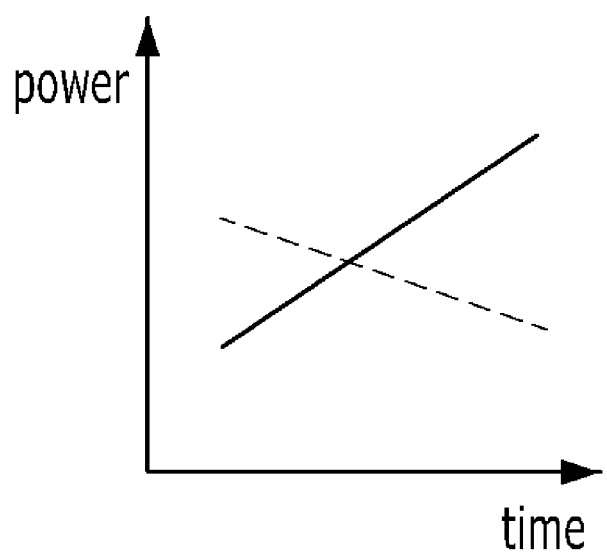

Referring to FIGS. 3A and 3B, the lines for the actual used power and the long-term prediction data may be spaced some distance without meeting each other. In this case, it is determined that the long-term prediction data tends to be consistent with the actual used power, but that there is some error requiring correction. Meanwhile, when the lines for the actual used power and the long-term prediction data cross with each other as shown in FIGS. 3C and 3D, it may be determined that correction is not necessary for the long-term prediction data.

In this way, it is determined whether correction of the long-term prediction data is necessary by comparing the long-term prediction data with data obtained by analyzing the power usage pattern immediately before the target time of the target date.

When it is determined that correction is necessary, the long-term prediction data may be corrected based on the power usage pattern immediately before the target time of the target date (S500). Here, a vertical movement method and/or a linear weighted moving average method may be used for the correction.

Figure 4A:
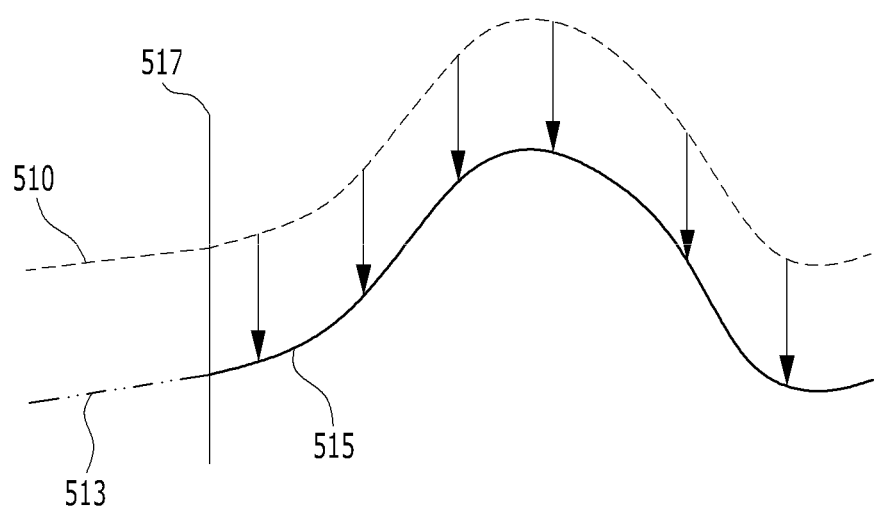
FIGS. 4A and 4B are diagrams respectively correction of long-term prediction data using a vertical movement method and/or a linear weighted moving average method, respectively, according to an exemplary embodiment of the present disclosure.
Figure 4B:
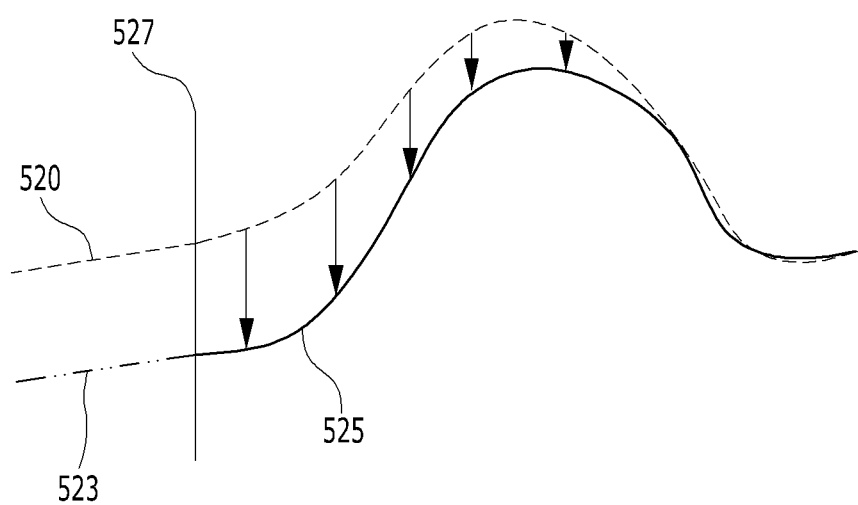

FIGS. 4A and 4B respectively show the correction of long-term prediction data (510, 520) using a vertical movement method and a linear weighted moving average method according to an embodiment of the present disclosure.

FIG. 4A illustrates a correction of long-term prediction data 510 using the vertical movement method. Throughout the time span of FIG. 4A, the long-term prediction data 510 is shifted by an average difference between the long-term prediction data 510 and the actual used power 513, occurring before the current time 517.

$$D(n) = \frac{\sum_{i=1}^{n}(P_r(-i) - P_a(-i))}{n}$$

$$P'_a(t) = P_a(t) + D(n)$$

Per the above equations, resulting prediction data $P_a'$ 515 may be corrected by adding the long-term prediction data $P_a$ 510 at each prediction time span to an average $D(n)$ of the values obtained by subtracting the long-term prediction data $P_a$ 510 from the actual used power $P_r$ 513 in the time span before the current time (time t=0), where n is the number of data points used to achieve the average $D(n)$. Here, n is 2, because the above example uses two data points, namely, fifteen and thirty minutes earlier than the current time.

FIG. 4B illustrates a correction of long-term prediction data 520 using the linear weighted moving average method, whereby influence on a power usage pattern is linearly reduced for prediction times following the current time 527.

$$P'_{a1}(t) = P_a(t) + \max\left(\frac{m-t}{m}, 0\right) \times D(n)$$

Per the above equation, the resulting prediction data $P'_{a1}(t)$ 525 may be obtained by adding the long-term prediction data $P_a(t)$ 520 at each prediction time span to a product of the linear weights and an average $D(n)$ of values obtained by subtracting the long-term prediction data $P_a$ 520 from the actual used power $P_r$ 523 at the time span before the current time (time t=0), where m is a time period influenced by $D(n)$. For example, m is 15 when only up to the 15th data point is to be influenced, or 15×15=225 (minutes). Then, if t represents the current time set to zero, the first data point may be represented as 15 (minutes); without information on the measurement interval, the first data point may be 1 (minute). After the 15th data point, the influence of $D(n)$ completely disappears. In the above equation, max(a, b) is a function of representing a larger value of a or b.

As shown in FIG. 4B, if the value of t is small, there is a significant difference between the corrected prediction data 525 and the long-term prediction data 520 due to $D(n)$. However, the difference decreases with time, and eventually the prediction data coincides with the long-term prediction data 520.

Figure 5:
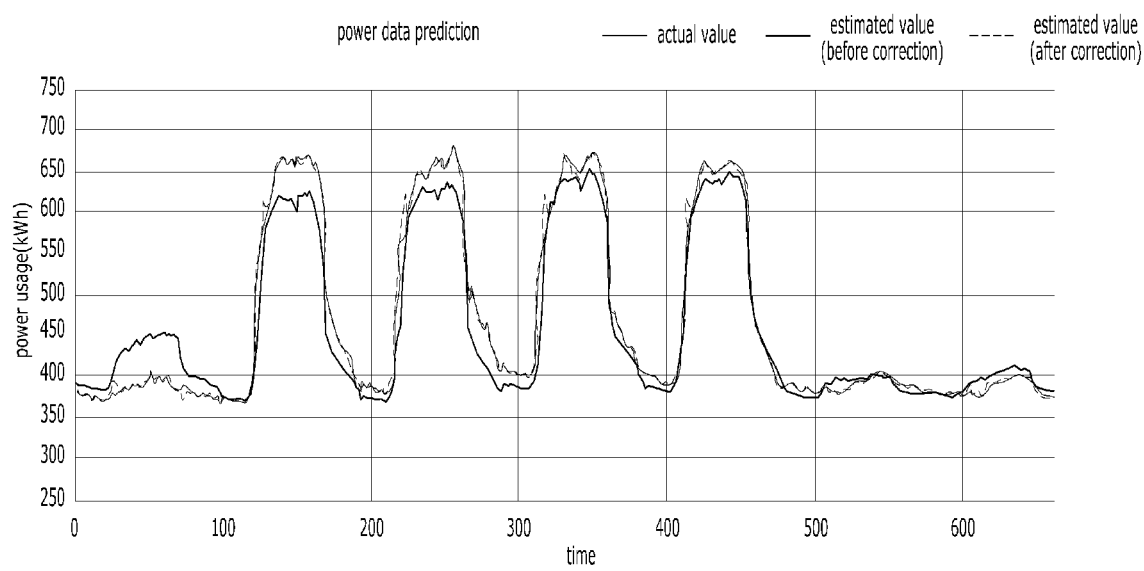
FIG. 5 is a graph comparing prediction data obtained by the method of FIG. 1 with actually used power.

FIG. 5 compares predicted data obtained by the above-described power demand prediction method with actually used power.

Referring to FIG. 5, the case of the long-term prediction data using only the past data indicates an accuracy of 98.7% as compared with actually used power, and the case of the prediction data with additional correction indicates an accuracy of 99.8% within one hour from the current time and an accuracy of 96.3% within twelve hours from the current time. The accuracy is obtained using mean absolute percentage error (MAPE).

As described above, according to the power demand prediction method of the present disclosure, it is possible to accurately predict the power demand in future, and control an efficient charge/discharge of the energy storage system (ESS) using the predicted power demand.

The energy storage system is a facility to allow the power to be stored and to be used as necessary. In the case of being used in connection with a building or a factory, it is charged at night when power rate is low, and discharged during daytime when power rate is high, whereby it is possible to lower power consumption costs by covering a part of power demand required by the building or factory.

Figure 6:
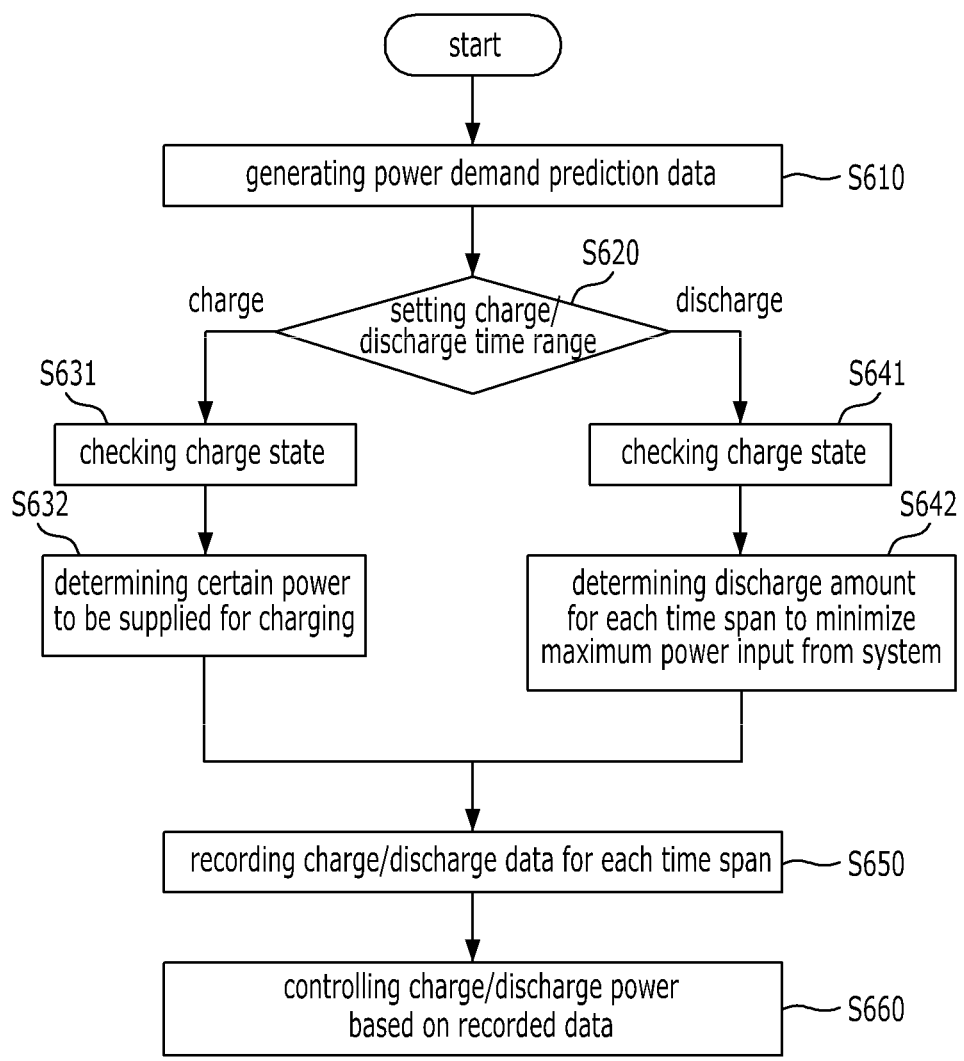
FIG. 6 is a flow diagram illustrating the control of charge/discharge of an ESS, based on the corrected power demand prediction data of FIG. 1.

FIG. 6 illustrates the control of charge/discharge of an ESS based on a power demand prediction made according to an embodiment of the present disclosure.

Referring to FIG. 6, to control ESS charge/discharge based on the power demand prediction of FIG. 1, the power demand prediction data for a specified time span is generated using the above-described method (S610). In this case, power demand prediction data may be generated at fifteen-minute intervals for 36 hours from the start of the power demand prediction.

Next, the charge time range and the discharge time range may be respectively set (S620). These settings may be performed based on the electricity billing system and/or power demand prediction data. Specifically, in order to reduce the peak value of electricity use, the electricity bill may be expensive during daytime and the electricity bill may be inexpensive at night. Accordingly, the ESS is controlled to be charged at night and discharged during daytime. Also, based on the power demand prediction data, the ESS is controlled to be charged in a time span when the predicted power demand is low, and discharged in a time span when the predicted power demand is high. Generally, considering such conditions, the charge time range is set from 23:00 to 09:00 every day, and the discharge time range is set from 09:00 to 23:00 every day.

When the set charge time range starts (for example, at 23:00), the charge state of an energy storage apparatus of the ESS is first checked (S631). When the energy storage apparatus is fully charged, the charging is not necessary and thus finished, and when the energy storage apparatus is not fully charged, it is determined that a certain power is to be supplied to charge the energy storage apparatus (S632).

In determining the power to supply to charge the energy storage apparatus under control, the maximum power may be supplied or a predetermined power level may be supplied in each time span by dividing the charge capacity of the energy storage apparatus by the length of time of the charge time range (for example, ten hours). As an example, as a result of checking a charge state of the energy storage apparatus (S631), assuming the power required to fully charge the energy storage apparatus is 200 kWh and the maximum power available for charging the energy storage apparatus is 50 kWh, the power to supply the energy storage apparatus may be set to 50 kWh so that the power can be supplied for 4 hours. Meanwhile, if available charging time is 8 hours, the power to supply the energy storage apparatus may be set to 25 kWh so that the power can be supplied for 8 hours. There are advantages that the former case allows charging efficiency of the energy storage apparatus to improve, whereas the latter case allows the maximum value of the power input from the system to be lowered.

Here, it is possible to record an amount of power to be used for charging the energy storage apparatus for each time span, as the charge data (S650), and control an amount of power to be supplied during charging based on the data (S660).

Meanwhile, in order to determine an amount of discharge power for each time span within the set discharge time range, the charge state of the energy storage apparatus is first checked (S641). It is possible to determine whether the energy storage apparatus is discharged to allow power to be supplied according to the charge state thereof, and calculate an amount of power ($P_B$) that may be supplied from the energy storage apparatus of the ESS. When it is determined that the energy storage apparatus is to be discharged, based on the predicted power demand data, a discharge power amount of the energy storage apparatus of the ESS for each time span may be determined so as to cause the maximum power of the power input from the system to be minimized in the discharge time range (S642). Minimizing the maximum power input from the system in the discharge time range means that the power input from the system in the discharge time range stays constant. For this purpose, it is assumed that an amount of power $P_L$ input from the system in the discharge time range is constant, and the power to be supplied from the energy storage apparatus of the ESS may be calculated to match the predicted power demand, in which the amount of power should be the same or similar to the amount of power that is charged into the energy storage apparatus.

That is, a value of $P_L$ is obtained satisfying the following equation.

$$P_B = \Sigma(P_a(n) - P_L)$$

Here, $P_B$ is the amount of power charged into the energy storage apparatus, $P_a(n)$ is the power demand predicted in each time span from the power demand prediction data, and $P_L$ is an amount of power input from system. The summation may be performed only when ($P_a(n) - P_L$) is greater than zero in the discharge time range. When $P_L$ is obtained via the above equation, the maximum value of the power input from the system may be minimized while using all the power charged into the ESS in the discharge time range. The discharge power ($P_o(n)$) that should be discharged from the energy storage apparatus of ESS for each time span may be obtained using the following equation.

$$P_o(n) = \max(0, P_a(n) - P_d)$$

Here, max (A, B) is a function for selecting a larger value of A and B, and $P_d$ is an amount of power input from the system determined by the above-described method. The amount of discharge from the energy storage apparatus of ESS obtained by such computation is recorded as discharge data (S650), and the amount of discharge from the energy storage system may be controlled based on the data in the discharge time range (S660).

The ESS charge/discharge control method proposed in the present disclosure enables efficient power use and a reduction of the burden on the system.

Now, a power demand prediction apparatus and an ESS charge/discharge apparatus for executing the above-described method will be described.

Figure 7:
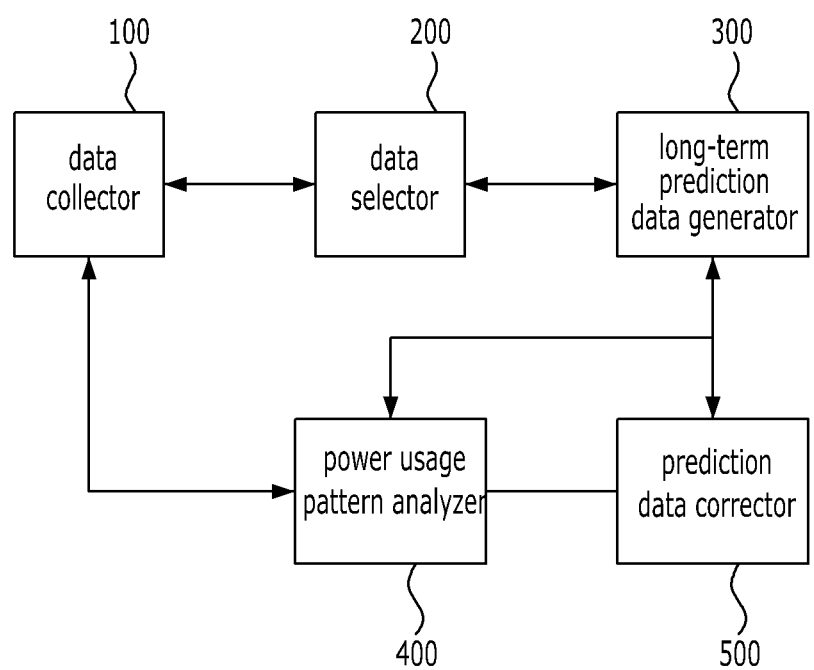
FIG. 7 is a block diagram of an apparatus for predicting power demand according to an exemplary embodiment of the present disclosure.

FIG. 7 shows a power demand prediction apparatus according to an embodiment of the present disclosure.

Referring to FIG. 7, the power demand prediction apparatus may include a data collector 100, a data selector 200, a long-term prediction data generator 300, a power usage pattern analyzer 400, and a prediction data corrector 500.

The data collector 100 may collect weather data and data on power used in the past. Here, the used power and weather data may be collected for at least one day to several years at an interval of fifteen minutes, in which the weather data may include an average temperature at the time of collection.

The data selector 200 may select data having a similar condition to a specific target date for which the power demand is to be predicted, from among the collected past data. As an example, it is possible to select data collected on a date between dates that are 15 days earlier and 15 days later than a specific target date every year. The data may also be selected according to whether the specific target date is a holiday, a weekday, or a date sandwiched between holidays. As an example, when the target date for which the power demand is to be predicted is June 15 and a weekday, the data selector 200 may select data collected on dates between May 31 and June 30 and corresponding to weekdays as data collected from the data collector 100, as data having a similar condition to a specific target date. Then, data of about 20 days except Saturday/Sunday/holiday may be selected for each year.

Figure 8:
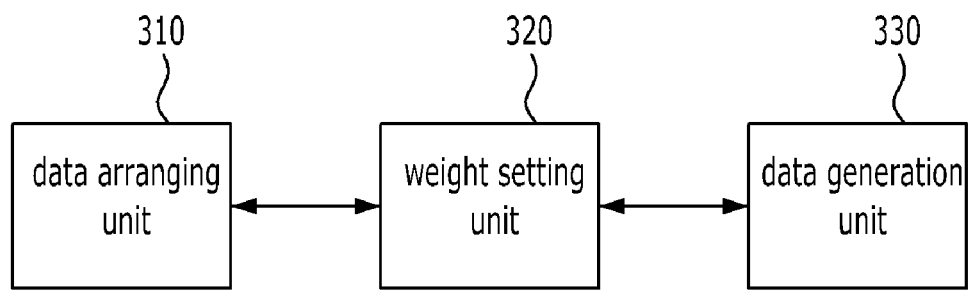
FIG. 8 is a block diagram illustrating a configuration of the long-term prediction data generation unit of FIG. 7.

The long-term prediction data generator 300 may generate the long-term prediction data for the power demand of a specific target date based on data selected from the data selector 200. FIG. 8 shows the configuration of a long-term prediction data generation unit 300 according to an embodiment of the present disclosure.

Referring to FIG. 8, the long-term prediction data generator 300 may include a data arrangement unit 310, a weight setting unit 320, and a data generation unit 330.

The data arrangement unit 310 calculates a difference between a predicted temperature for a specific target date for which the power demand is to be predicted and a temperature at the time of collecting each data point selected by the data selector 200, and arranges the selected data in order of increasing temperature difference. Herein, all the data of one day may be arranged at a time using daily average temperature, meanwhile each data point may be arranged for each time span based on temperature in a time span when each data point is collected. Although the amount of computation in the latter case is much larger than that in the former, it is possible to obtain more accurate data for each time span.

The weight setting unit 320 may set a weight indicating a degree of influence on the long-term prediction data of the selected data. As a variation, the weights may be set based on a difference between the corresponding year of the target date and the year at the time of collecting the selected data. In other words, when the year of the target date is the same as the year at the time of collecting the selected data, the weight is 1, 0.9 when the difference is 1 year, 0.8 when the difference is 2 years, 0.7 when the difference is 3 years, 0.6 when the difference is 4 years, and 0.5 when the difference is 5 years. When the weights are set as in the above example, the data collected in a year closer to the target date is given a higher weight, thereby having more influence on the long-term prediction data generated later.

The data generation unit 330 may generate the long-term prediction data for the power demand of a specific target date using a weighted average based on each selected data point and the weight of each data point as obtained from the weight setting unit 320. The weighted average may be obtained by dividing a sum of values, obtained by multiplying the used power of the selected data with the weights, by a sum of the weights. Here, the weighted average may be obtained based on all the selected data, while the weighted average may be obtained using only the ten data points having the smallest temperature difference based on an arrangement order of the data arranging unit 310. Alternatively, the weighted average may be obtained using only data having a temperature difference within a predetermined temperature range.

In this case, the long-term prediction data generated by the data generation unit 330 may include prediction data at fifteen-minute intervals from 00:00 to 23:45 of the prediction target date. Alternatively, it is possible to further increase the time to be predicted and thus include the prediction data up to 12:00 o'clock the next day. That is, the data generation unit 330 may generate the prediction data by obtaining a weighted average for each time span, thereby generating the long-term prediction data having power demand prediction data for 96 time spans per a day.

Referring again to FIG. 7, the power usage pattern analyzer 400 may determine whether it is necessary to correct the long-term prediction data generated by the long-term prediction data generator 300 by analyzing the power usage pattern immediately before a target time of a target date. For this, the power usage pattern analyzer 400 may analyze a relationship between the actual used power of fifteen and thirty minutes earlier than the current time of generating the prediction data and data predicted at the same point of time as the long-term prediction data obtained by the long-term prediction data generator 300. Then, as shown in FIGS. 3A and 3B, the lines for the actual used power and the long-term prediction data may be spaced some distance without meeting each other. In this case, the power usage pattern analyzer 400 determines that the long-term prediction data tends to be consistent with the actual used power, but that there is some error requiring the correction. However, when the lines for the actual used power and the long-term prediction data cross each other as shown in FIGS. 3C and 3D, the power usage pattern analyzer 400 may determine that it is not necessary to correct the long-term prediction data. In this way, the power usage pattern analyzer 400 may compare the used power pattern immediately before the target time of the target date for which power demand is to be predicted, with the generated long-term prediction data, thereby determining whether it is necessary to correct the long-term prediction data.

In addition, the prediction data correction unit 500 may correct the long-term prediction data using a vertical movement method and a linear weighted moving average method when it is determined that the correction is necessary.

The vertical movement method adds an average of values obtained by subtracting the power estimated by the long-term prediction data from the actual used power before the current time, to the prediction data in entire time spans of the long-term prediction data. That is, according to the vertical movement method, the prediction data of the entire time spans included in the long-term prediction data is shifted the same amount.

The linear weighted moving average method is a method in which as it moves further from the current time, an influence of power usage pattern on the long-term prediction data is linearly reduced before the current time. That is, the linear weighted moving average method may correct the long-term prediction data by allowing an average of values obtained by subtracting the long-term prediction data from the actual used power in the time span before the current point of time to be added to the long-term prediction data at each prediction time span, after being multiplied by a linear weight. Then, a difference between the corrected long-term prediction data and the original long-term prediction data decreases with time, and as a result they are the same.

By using the above-described power demand prediction apparatus, it is possible to accurately predict the power demand in future, and control efficient charge/discharge of the ESS using the prediction.

Figure 9:
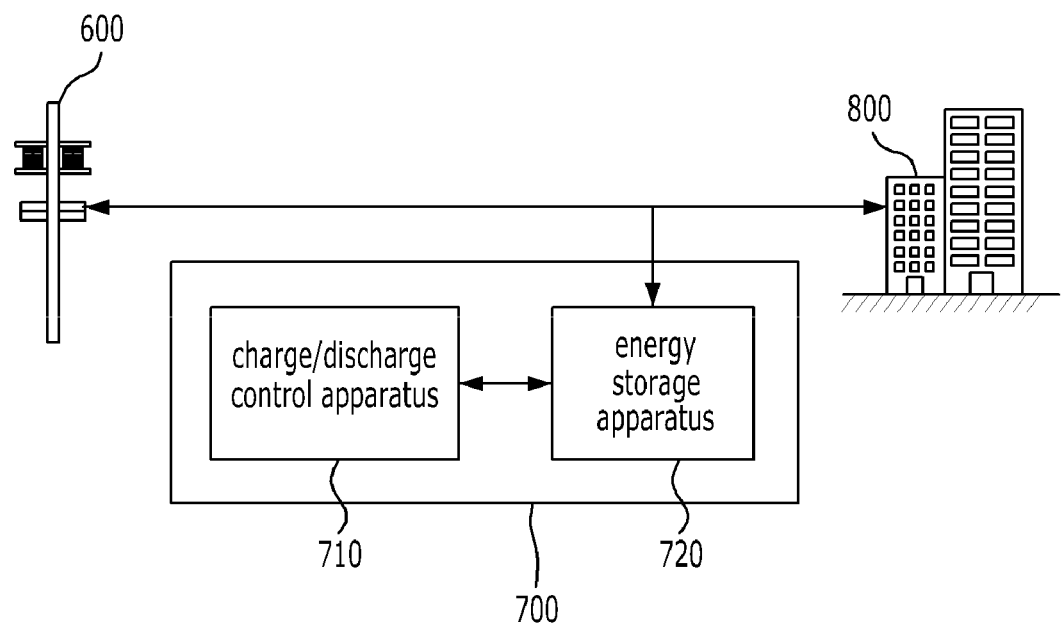
FIG. 9 is a schematic block diagram of an energy storage system (ESS) to illustrate ESS operation, according to an exemplary embodiment of the present disclosure.

FIG. 9 shows an ESS and its operation according to an embodiment of the present disclosure.

Referring to FIG. 9, the energy storage system 700 may charge the energy storage apparatus 720 using the power input from the system 600, and may discharge the power charged into the energy storage apparatus 720 to allow additional power to be supplied to the building 800 in addition to the power supplied from the system 600. The energy storage system 700 may include an energy storage apparatus 720 for allowing power to be charged and a charge/discharge control apparatus 710 for controlling the charging and discharging of the energy storage apparatus, enabling power to be charged into or discharged from the energy storage apparatus 720 under the control of the charge/discharge control apparatus 710.

Figure 10:
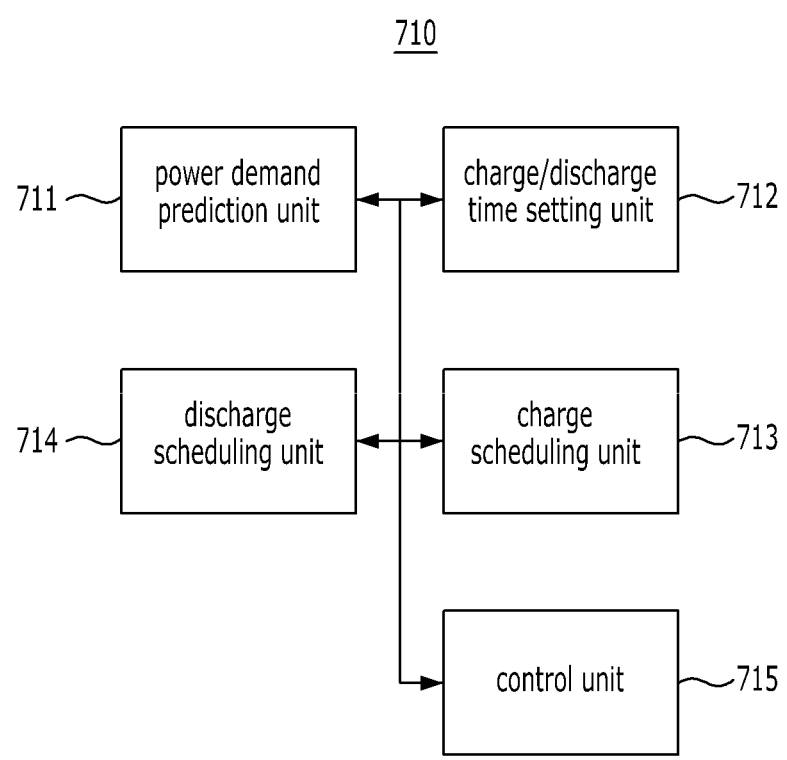
FIG. 10 is a block diagram of the charge/discharge control apparatus of FIG. 9.

FIG. 10 illustrates a configuration of the charge/discharge control apparatus 710.

Referring to FIG. 10, the charge/discharge control apparatus 710 used in the energy storage system of FIG. 9 may include a power demand prediction unit 711, a charge/discharge time setting unit 712, a charge scheduling unit 713, a discharge scheduling unit 714, and a control unit 715.

The power demand prediction unit 711 includes the power demand prediction apparatus described above and may determine, for each time span, the power demand predicted to be used by the consumer 800 after the current point of time. As a variation, the power that will be used by the consumer 800 at an interval of 15 minutes may be predicted, thereby generating power demand prediction data.

The charge/discharge time setting unit 712 may set a time range when the energy storage apparatus 720 is charged and a time range when the energy storage apparatus 720 is discharged. Such settings may be set based on the electricity billing system and/or power demand prediction data. Specifically, the energy storage apparatus 720 may be set to be charged at night when the electricity bill is low, and the energy storage apparatus 720 may be set to be discharged during a daytime when the electricity bill is high. Alternatively, the power storage apparatus 720 may be set to be charged in a time span where the power demand is low and discharged in a time span where the power demand is high based on the power demand data predicted by the power demand prediction unit 711. As a variation, the charge time range may be set from 23:00 to 09:00 every day, and the discharge time range may be set from 09:00 to 23:00 every day.

The charge scheduling unit 713 may schedule the amount of power to be supplied for each time span in order to charge the energy storage apparatus 720 in a charge time range set by the charge/discharge time setting unit 712. As a variation, the amount of power may be scheduled to be supplied at an interval of 15 minutes. To this end, the energy storage apparatus 720 first checks the charge state thereof to calculate the amount of power required until the energy storage apparatus (that is, battery) is fully charged, and then schedules to allow the maximum power capable of charging the energy storage apparatus to be supplied for a specific time or allow the required amount of power to be divided by the preset charge time so that a certain power is supplied to the energy storage apparatus in each time span. As an example, as a result of checking a charge state of the energy storage apparatus, assuming that the power required to be fully charged into the energy storage apparatus is 200 kWh and the maximum power available for charging the energy storage apparatus is 50 kWh, the power to be supplied may be set to 50 kWh to allow the apparatus to be charged at 50 kWh for 4 hours, and the power be supplied is set to 25 kWh to allow the apparatus to be charged at 25 kWh for 8 hours when the charge time is 8 hours. Here, it is also possible to correct the amount of power that is actually supplied considering errors, or to perform additional charging by completing the charging according to the schedule and then check the charge state of the energy storage apparatus 720 again. The amount of power supplied to charge the energy storage device scheduled by the charge scheduling unit 713 may be described as data and may be actually used by the control unit 715 later.

The discharge scheduling unit 714 may schedule the amount of power to be discharged in each time span of the discharge time range of the energy storage apparatus 720. To this end, the charge state of the energy storage device is first checked to determine the amount of power capable of being supplied and an amount of power discharged from the energy storage apparatus 720 is determined for each time span to allow the maximum power input from the system 600 to be minimized based on the power demand predicted by the power demand prediction unit 711. For this purpose, the amount of power input from the system 600 in the discharge time range is kept constant, and the remaining amount of power may be supplied as the power discharged from the energy storage apparatus 720 of the energy storage system 700. For this purpose, the discharge scheduling unit 714 may calculate the power that should be supplied from the energy storage apparatus of the ESS in order to meet the predicted power demand, assuming that the power $P_L$ input from the system keeps constant in the discharge time range, in which the amount of power should be the same or similar to the amount of power charged into the energy storage system. That is, $P_L$ is obtained satisfying an equation of $P_B = \Sigma(P_a(n) - P_L)$, where $P_B$ is the amount of power charged into the energy storage apparatus, $P_a(n)$ is the power demand predicted in each time span from the power demand prediction data, and $P_L$ is an amount of power input from system. The summation may be performed only when $P_a(n) - P_L$ is greater than zero in the discharge time range. When the $P_L$ is obtained via the above equation, the maximum value of the power input from the system may be minimized while using all the power charged into the energy storage apparatus 720 of the ESS in the discharge time range. The discharge power $P_o(n)$ that should be discharged from the energy storage apparatus 720 in each time span may be obtained using an equation of $P_o(n) = \max(0, P_a(n) - P_d)$, where max (A, B) is a function for selecting a larger value of A and B, and $P_L$ is an amount of power input from the system determined via the above-described method. The discharge power at each time span scheduled by the discharge scheduling unit 714 is recorded as discharge data, and used by a control unit 715 later.

The control unit 715 may control to charge or discharge the energy storage apparatus 720 according to the charge scheduling and discharge scheduling for each time span scheduled by the charge scheduling unit 713 and the discharge scheduling unit 714.

By using the energy storage system proposed by the present disclosure described above, a part of the power required for the consumer 800 is charged at a low rate at night and then supplied during a high-priced week, thereby lowering the electricity bill for the consumer 800, and the maximum power that should be supplied from the system 600 is caused to be minimized, thereby helping stabilize the system 600.

Hereinafter, a charge/discharge control apparatus according to a second embodiment of the present disclosure will be described.

Figure 11:
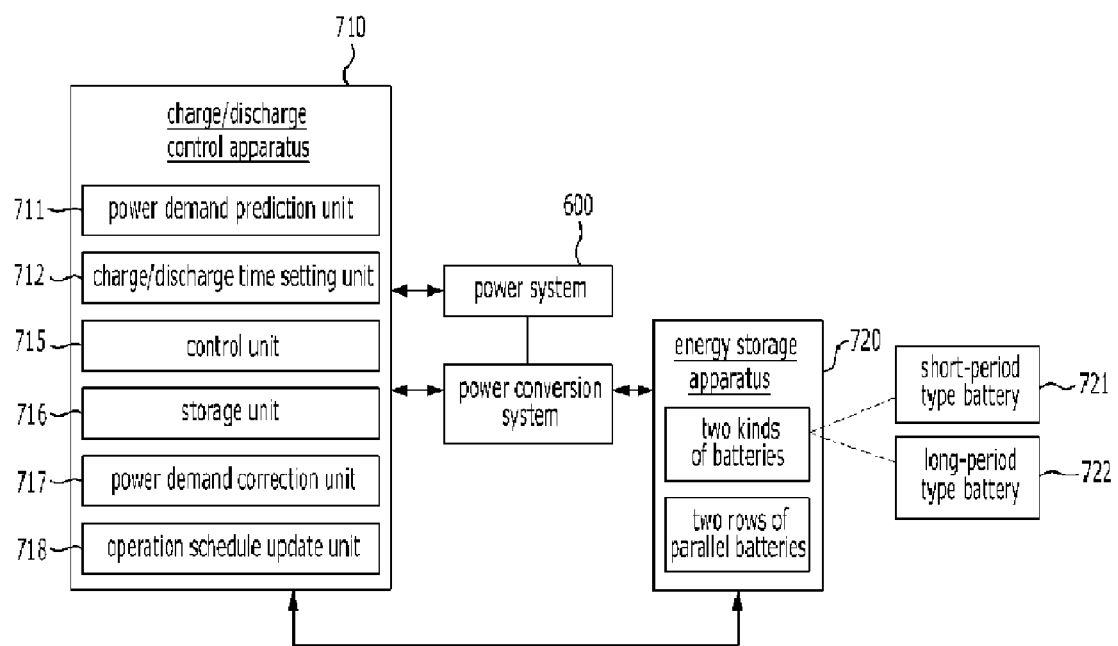
FIG. 11 is a block diagram of a charge/discharge control apparatus and an energy storage system including the apparatus according to a second embodiment of the present disclosure.

FIG. 11 illustrates a charging/discharge control apparatus and an energy storage system including the apparatus according to the second embodiment of the present disclosure.

Referring to FIG. 11, a charge/discharge control apparatus 710 is connected to the power system 600 to frequently check the power load of the consumer, and is connected to the energy storage apparatus 720 through a power conversion system to manage the charge/discharge scheduling of the energy storage system.

Here, the connection between the charge/discharge control apparatus 710 and the power system 600, or between the charge/discharge control apparatus 710 and the energy storage apparatus 720 may be interconnected through a wired cable, or may be connected through communication. The communication may be wired communication or wireless communication.

The charge/discharge control apparatus 710 according to the second variation includes a power demand prediction unit 711, a charge/discharge time setting unit 712, a control unit 715, and a storage unit 716, and may further include a power demand correction unit 717 and an operation schedule update unit 718.

First, the power demand prediction unit 711 predicts power demand of a consumer within a predefined period, i.e., at least one time span, based on the past power usage data of the consumer as described above.

Next, the charge/discharge time setting unit 712 creates charge/discharge operation schedules of the energy storage apparatus 720 based on the predicted power demand, and performs charge/discharge operation on the energy storage apparatus 720 according to the created charge/discharge operation schedule to manage the energy storage apparatus 720. The data thus processed is stored in the storage unit 716.

The control unit 715 may control to charge or discharge the energy storage apparatus 720 according to the charge/discharge operation schedule created by the charge/discharge time setting unit 712.

The storage unit 716 may collect and store the past power usage data of the consumer from the power system 600 via communication. Here, the consumer 800 may be referred to as a residential group such as a building, a factory, and a house, as a consumer who purchases electricity. The past power usage data may be statistically generated in various forms based on power used in the past.

For example, the past power usage data shows the results of a specific consumer using power on a per-year basis, on a per-month basis, or on a per-day basis for a recent several years, or statistical result of a specific consumer using power every season for a recent several years.

Here, when the statistical past power usage data is large scale, the storage unit 716 may be implemented as a data-base or a storage medium. Alternatively, when the statistical past power usage data is small scale, the storage unit 716 may be implemented as a volatile memory or a non-volatile memory. Here, the storage medium may be embedded inside or mounted outside.

Next, the power demand correction unit 717 may extract the power demand data stored in the storage unit 716 and collect the actual load of a specific consumer corresponding to the same time span as that of the power demand data from the power system 600.

Also, the power demand correction unit 717 may determine whether a difference between the extracted power demand data (predicted power demand) and the collected actual load of the consumer exceeds a predefined reference value, and then correct the extracted power demand data.

For example, the power demand correction unit 717 may perform correction in such a manner that the power demand data is increased or decreased by a predefined value when the difference between the power demand data and the actual load exceeds the reference value. In contrast, the power demand correction unit 717 maintains daily charge/discharge operation of the energy storage apparatus 720 according to charge/discharge operation schedule created based on the power demand data when the difference between the power demand data and the actual load does not exceed the reference value. The data processed by the power demand correction unit 717 is also stored in the storage unit 716.

Next, the operation schedule update unit 718 is provided to extract the power demand correction data (corrected power demand) stored in the storage unit 716, collect charge/discharge state of the energy storage apparatus corresponding to the same time span as that of the power demand correction data from the energy storage apparatus 720, and update the charge/discharge operation schedule stored in the storage unit 716 in consideration of the extracted power demand correction data and the collected charge/discharge state data.

For example, the operation schedule update unit 718 may update the charge operation schedule of the charge/discharge operation schedule based on the power demand correction data when the charge/discharge state data is in a need of charging, and the discharge operation schedule of the charge/discharge operation schedule based on the power demand correction data when the charge/discharge state data is in a need of discharging.

As such, the charge/discharge state data may be referred to as data obtained by monitoring the current or past charge/discharge state related to how much power is being charged into the energy storage apparatus 720 and was discharged and supplied to the power system in the past.

In addition, the control unit 715 may resume charge/discharge management of the energy storage apparatus 720 based on the updated charge/discharge operation schedule extracted from the storage unit 716. Since the charge/discharge management of the energy storage apparatus 720 is performed via the updated charge/discharge operation schedule, there are many advantages in that it is possible to deal with an occurrence of an unexpected peak and to increase the battery usage.

On the other hand, the operation schedule update unit 718 may update the charge/discharge operation schedule further considering the charge/discharge state of at least two kinds of batteries or at least two rows of parallel structured batteries. Here, the two kinds of batteries may include a long-period type battery 722 having a longer discharge period than the short-period type battery 721 and a short-period type battery 721 having a shorter discharge period than the long-period type battery 722.

For example, the operation schedule update unit 718 may update the charge/discharge operation schedule in consideration of power discharged from the short-period type battery 721 to deal with a peak charge requiring a momentary high output, and also update the charge/discharge operation schedule in consideration of power discharged from the long-period type battery 722 to support a base load without a change.

That is, according to the present variation, the charge/discharge operation schedule is updated by using a combination of at least two kinds or at least two rows of parallel structured batteries having different charging periods and output characteristics, so that each battery may be efficiently driven to be output, thereby improving the charge/discharge scheduling efficiency, and the peak cut may be reduced, thereby lowering a basic fee and a usage fee for the consumer.

Meanwhile, the power demand correction unit 717 and the operation schedule update unit 718 may be repeatedly performed every prescribed interval of minutes of the day. For example, the functions of the power demand correction unit 717 and the operation schedule update unit 718 are repeatedly performed at an interval of 15 minutes, and as a result, the charge/discharge operation schedule is continuously updated so that charge/discharge management for the energy storage apparatus 720 may be performed.

Hereinafter, the configuration of the charge/discharge control apparatus 710 according to the second embodiment of the present disclosure will be described in more detail with reference to FIG. 12.

Figure 12:
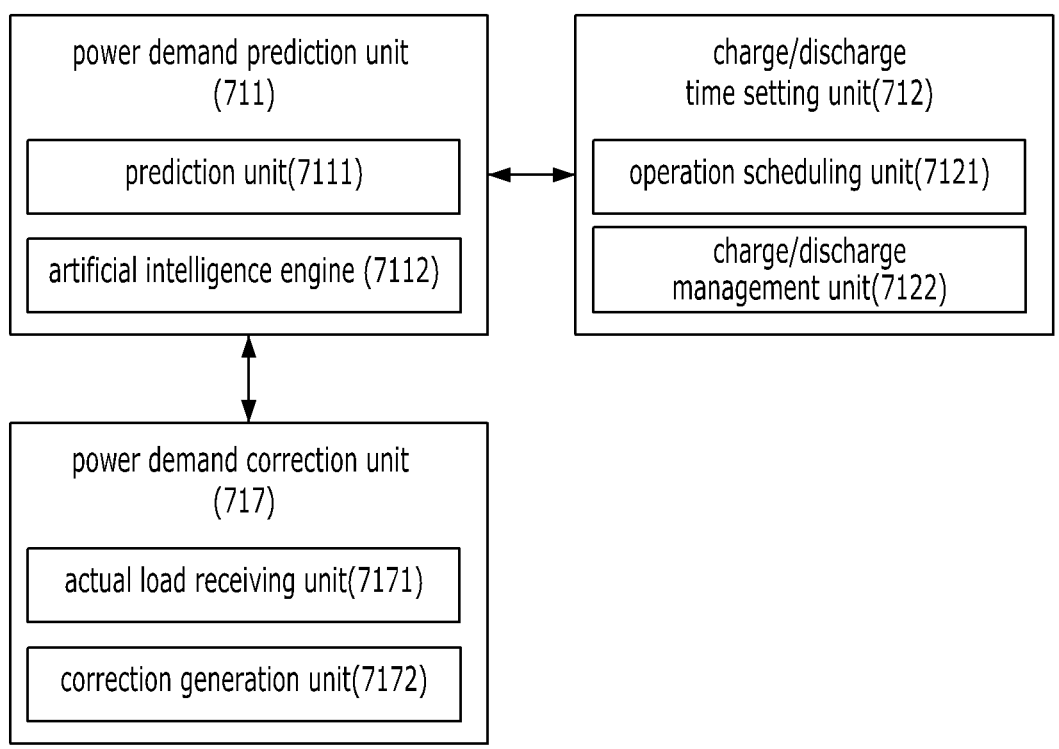
FIG. 12 is a detailed block diagram of portions of the charge/discharge control apparatus of FIG. 11.

Referring to FIG. 12, a power demand prediction unit 711 of the charge/discharge control apparatus 710 may include a prediction unit 7111 and an artificial intelligence engine 7112; the discharge time setting unit 712 may include an operation scheduling unit 7121 and a charge/discharge managing unit 7122; and the power demand correction unit 717 may include an actual load receiving unit 7171 and a correction generating unit 7172.

Explaining first the power demand prediction unit 711, the predictor 7111 predicts the power demand of the consumer within an predefined period via at least one of a prediction algorithm, a statistical technique, and a Delphi technique of the artificial intelligence engine 7112 that has been mechanically learned the past power usage data as well as a weather forecast pattern and a consumer characteristic pattern, to generate the power demand data. Here, the weather forecast pattern indicates weather conditions collected during season or a specific period that affect the power consumption, and the consumer characteristics pattern indicates a power consumption pattern depending on a residence pattern of the people such as cities, farming village, and fishing village or a power consumption pattern depending on a size of building, such as factories, houses, small buildings and large buildings. However, the present disclosure is not limited thereto.

Meanwhile, the prediction algorithm of the artificial intelligence engine 7112 may be at least one of a supervised learning algorithm that predicts the power demand by analyzing how the collected data (power usage data, weather forecast pattern, and consumer characteristic pattern) is divergent from reference points having power consumption patterns consumed by actual consumers, a non-supervised learning algorithm that predicts the power demand by analyzing a degree of clustering of the data (power usage data, weather forecast pattern, and consumer characteristic pattern), and a reinforcement learning algorithm that predicts the power demand by analyzing a degree of interaction of data (such as power usage data, weather forecast pattern, and consumer characteristic pattern).

The power demand prediction unit 711 according to the present disclosure is provided to meaningfully apply the supervised learning algorithm, the non-supervised learning algorithm, and the reinforcement learning algorithm, and further the statistical technique, and the Delphi technique, to the power demand prediction.

Next, the charge/discharge time setting unit 712 will be described. The operation scheduling unit 7121 creates daily charge/discharge operation schedules of the energy storage device based on the predicted power demand data.

The charge/discharge management unit 7122 may manage a charge/discharge operation of the energy storage apparatus 720 based on the created daily charge/discharge operation schedule, and further manage a charge/discharge operation of the energy storage device based on the updated charge/discharge operation schedule.

Next, the power demand correction unit 717 includes an actual load receiving unit 7171 and a correction generation unit 7172, in which the actual load receiving unit 7171 receives the actual load of the consumer from the corresponding power system 600; and the correction generation unit 7172 determines whether a difference between the actual load of the corresponding consumer received from the actual load receiving unit 7171 and the power demand data predicted in FIG. 11 or the power demand data predicted via the artificial intelligence algorithm exceeds a preset reference value, and corrects the predicted power demand data upwards or downwards when the difference is out of the reference value.

For example, assuming a preset reference value is 3 KW, when an actual load is 8 KW and a predicted power demand data is 12 KW, then a difference between the predicted power demand data and the actual load is 4 KW, in which the difference of 4 kW exceeds the preset reference value of 3 KW, so that correction may be performed in such a way that the predicted power demand data is lowered.

Accordingly, the operation schedule update unit 718 of FIG. 11 updates the charge/discharge operation schedule in consideration of power demand corrected by the correction generation unit 7172 and a charge/discharge state of the energy storage apparatus 720.

Here, the correction generation unit 7172 and the operation schedule update unit 718 may be repeatedly executed every prescribed interval of minutes of the day, thereby frequently updating the charge/discharge operation schedule.

Figure 13A:
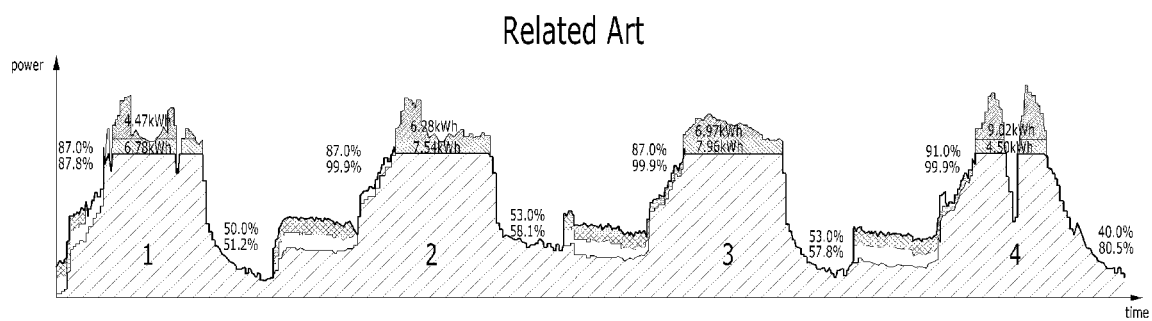
FIG. 13A is a graph showing an actual charge/discharge operation result using a contemporary charge/discharge operation schedule.
Figure 13B:
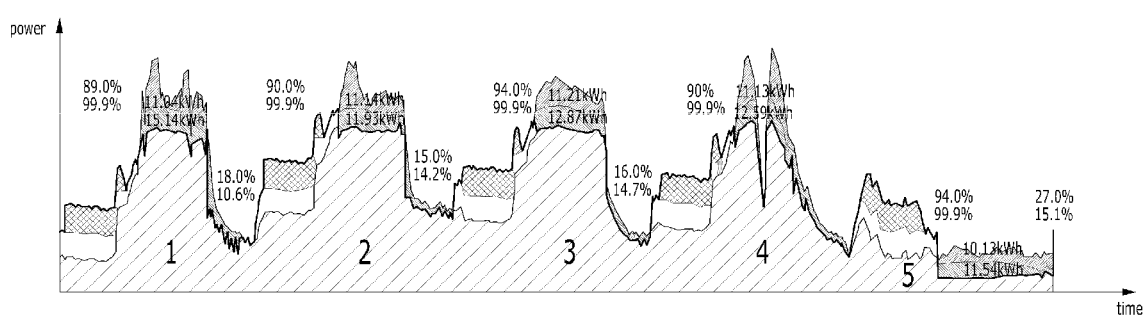
FIG. 13B is a graph showing an actual charge/discharge operation result using charge/discharge operation schedule updated according to an embodiment of the present disclosure.

FIG. 13A shows an actual charge/discharge operation result using a contemporary charge/discharge operation schedule; and FIG. 13B shows an actual charge/discharge operation result using the charge/discharge operation schedule updated according to an embodiment of the present disclosure.

FIG. 13A is a result of performing actual charge/discharge operation by establishing a charge/discharge operation schedule of the energy storage device based on the existing predicted power demand, in which the graph shows an example to which long-period type battery and a short-period type battery are applied.

FIG. 13B is a result of performing an charge/discharge operation by establishing a charge/discharge operation schedule of the energy storage device based on the predicted power demand, and correcting the predicted power demand to update the established charge/discharge operation schedule, in which the graph also shows an example to which a long-period type battery and a short-period type battery are applied.

Reference numerals 1 to 4 shown in FIGS. 13A and 13B correspond to each other, and reference numeral 5 shown in FIG. 13B is a additional result compared with FIG. 13A, and indicates a battery usage efficiency within the period such as a weekend.

A graph 1 in FIG. 13A shows a discharge efficiency of 87.0% to 87.8%, and a graph 1 of FIG. 13B shows a discharge efficiency of 89.0% to 99.9%, so that it is appreciated that the efficiency of FIG. 13B is higher than that of FIG. 13A. Relating to an amount of charge remaining in the battery, the graph 1 of FIG. 13A shows 50.0% to 51.2%, and the graph 1 of FIG. 13B shows 18.0% to 10.6%, so it is appreciated that the remaining amount of charge is greatly reduced and thus the battery use efficiency is higher in FIG. 13B.

Similarly, considering graphs 2 to 4 shown in FIGS. 13A and 13B, it will be appreciated that a discharge efficiency shown in FIG. 13B is higher than a discharge efficiency shown in FIG. 13A, and thus the battery use efficiency is also higher.

In addition, when the charge/discharge operation is performed according to the charge/discharge operation schedule updated under a specific condition such as a weekend, a graph 5 of FIG. 13B shows that a battery charge rate is 94.0% to 99.9% immediately before discharging, and an amount of charge remaining in the battery is 15.1%~27.0%, which indicates higher battery usage efficiency.

The graph 1 of FIG. 13A shows that a discharge power amount of the short-period type battery is 4.47 kWh and a discharge power amount of the long-period type battery is 6.78 kWh, and the graph 1 of FIG. 13B shows that a discharge power amount of the short-period type battery is 11.04 kWh and a discharge power amount of the long-period type battery is 15.14 kWh, and accordingly it is appreciated that the battery usage efficiency of FIG. 13B is higher than that of FIG. 13A.

It will be appreciated that a load power (black solid line) used in the consumer from the graph of FIG. 13B is generated under a predefined peak cut of FIG. 13A that results from operating based on the peak cut (peak cut based on the existing use data+margin of a certain level), and therefore the peak cut may be lowered.

Figure 14:
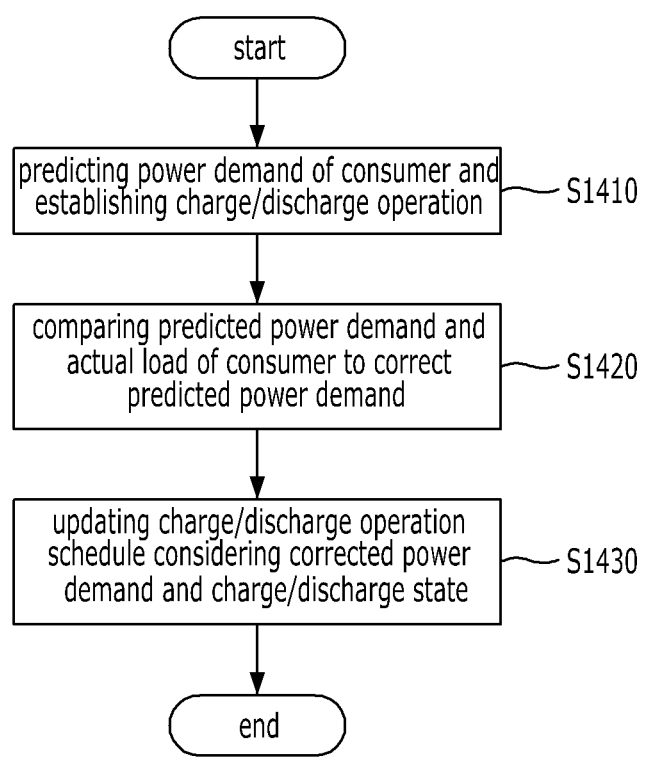
FIG. 14 is a flowchart illustrating an energy management method of a charge/discharge control apparatus according to an embodiment of the present disclosure.

FIG. 14 illustrates an energy management method of a charge/discharge control apparatus according to an embodiment of the present disclosure.

Referring to FIG. 14, the energy management method includes steps S1410 to S1430 which are implemented by the charge/discharge control apparatus 710.

First, in step S1410, the charge/discharge control apparatus 710 is provided to predict power demand of a consumer within a predefined period based on the past power usage data of the consumer, establish charge/discharge operation schedule of the energy storage apparatus 720 based on the predicted power demand, and perform a charge/discharge operation of the energy storage apparatus 720 according to the established charge/discharge operation schedule, thereby managing the energy storage apparatus 720.

Here, the consumer may be referred to as a residential group such as a building, a factory, and a house, as a consumer who purchases electricity, and the past power usage data may be statistically generated in various forms based on power used in the past by the consumer. For example, the past power usage data shows results of a specific consumer using power on a per-year basis, on a per-month basis, or on a per-day basis for the past several years, or statistical result of a specific consumer using power every seasons for the past several years. Here, the charge/discharge control apparatus 710 may use at least one of a prediction algorithm, a statistical technique, and a Delphi technique of the artificial intelligence engine 7112, so as to predict the power demand more accurately.

For example, the charge/discharge control apparatus 710 predict the power demand of the consumer via at least one of a prediction algorithm, a statistical technique, and a Delphi technique of the artificial intelligence engine 7112 that has been mechanically learned the past power usage data as well as a weather forecast pattern and a consumer characteristic pattern, so as to generate the power demand data.

Here, the weather forecast pattern indicates weather conditions collected during season or a specific period that affect the power consumption, and the consumer characteristic pattern indicates a power consumption pattern depending on the residence pattern of the people such as cities, farming village, and fishing village or a power consumption pattern depending on the size of building, such as factories, houses, small buildings and large buildings. However, the present disclosure is not limited thereto.

Meanwhile, the prediction algorithm of the artificial intelligence engine 7112 may be at least one of a supervised learning algorithm that predicts power demand by analyzing how far the collected data (power usage data, weather forecast pattern, and consumer characteristics pattern) is away from reference points having power consumption patterns consumed by actual consumers, a non-supervised learning algorithm that predicts power demand by analyzing a degree of clustering of the data (power usage data, weather forecast pattern, and consumer characteristic pattern), and a reinforcement learning algorithm that predicts power demand by analyzing a degree of interaction of data (such as power usage data, weather forecast patterns, and consumer characteristics patterns).

In step S1420, the charge/discharge control apparatus 710 collects an actual load of a specific consumer corresponding to the same time span as power demand data, from the power system 600, and correct the power demand data by determining whether a difference between the predicted power demand data based on the past data and the power demand data predicted via the above-described artificial intelligence algorithm exceeds a predefined reference value.

For example, the charge/discharge control apparatus 710 performs a correction in such a way to move the power demand data upwards or downwards by a predetermined value when the difference between the power demand data and the actual load is larger than the reference value, and maintains daily charge/discharge operation of the energy storage apparatus 720 according to the charge/discharge operation schedule established based on the power demand data when the difference between the power demand data and the actual load is smaller than the reference value.

For example, assuming that the predefined reference value is 2 to 3 KW, when the actual load is 8 KW and the predicted power demand data is 12 KW, the difference between the predicted power demand data and the actual load is 4 KW, in which the difference exceeds the predefined reference value, so that the correction is performed to lower the predicted power demand data.

In step S1430, the charge/discharge control apparatus 710 is provided to extract the power demand correction data (corrected power demand), collect a battery charge/discharge state corresponding to the same time span as the power demand correction data from the energy storage apparatus 720, and update the charge/discharge operation schedule in consideration of the collected power demand correction data and the charge/discharge state data.

For example, the charge/discharge control apparatus 710 may update the charge operation schedule of the charge/discharge operation schedule based on the power demand correction data when the charge/discharge state date is in a need of charging, and update the discharge operation schedule of the charge/discharge operation schedule based on the power demand correction data when the charge/discharge state date is in a need of discharging.

Then, the charge/discharge control apparatus 710 may resume charge/discharge management of the energy storage apparatus 720 based on the updated charge/discharge operation schedule. Since the charge/discharge management of the energy storage apparatus 720 is performed through the updated charge/discharge operation schedule, there are advantages in that it is possible to deal with an occurrence of an unexpected peak and to increase the battery usage.

Meanwhile, in step S1430, the charge/discharge control apparatus 710 may update the charge/discharge operation schedule further considering charge/discharge states of at least two kinds of batteries or at least two rows of parallel structured batteries. Here, the two kinds of batteries may include a long-period type battery 722 having a longer discharge period than the short-period type battery 721 and a single-phase type battery 721 having a shorter discharge period than the long-period type battery 722.

For example, the charge/discharge control apparatus 710 may update the charge/discharge operation schedule in consideration of power discharged from the long-period type battery 722 to deal with a peak charge requiring a momentary high output, and also update the charge/discharge operation schedule in consideration of power discharged from the short-period type battery 721 to support a base load without a change.

Meanwhile, in steps S1420 and S1430, the charge/discharge control apparatus 710 is repeatedly performed every prescribed interval of minutes. For example, the functions of steps S1420 and S1430 are repeatedly performed at an interval of 15 minutes, so that the charge/discharge operation schedule may be continuously updated, thereby enabling charge/discharge management of the energy storage apparatus 720 to be performed.

Figure 15:
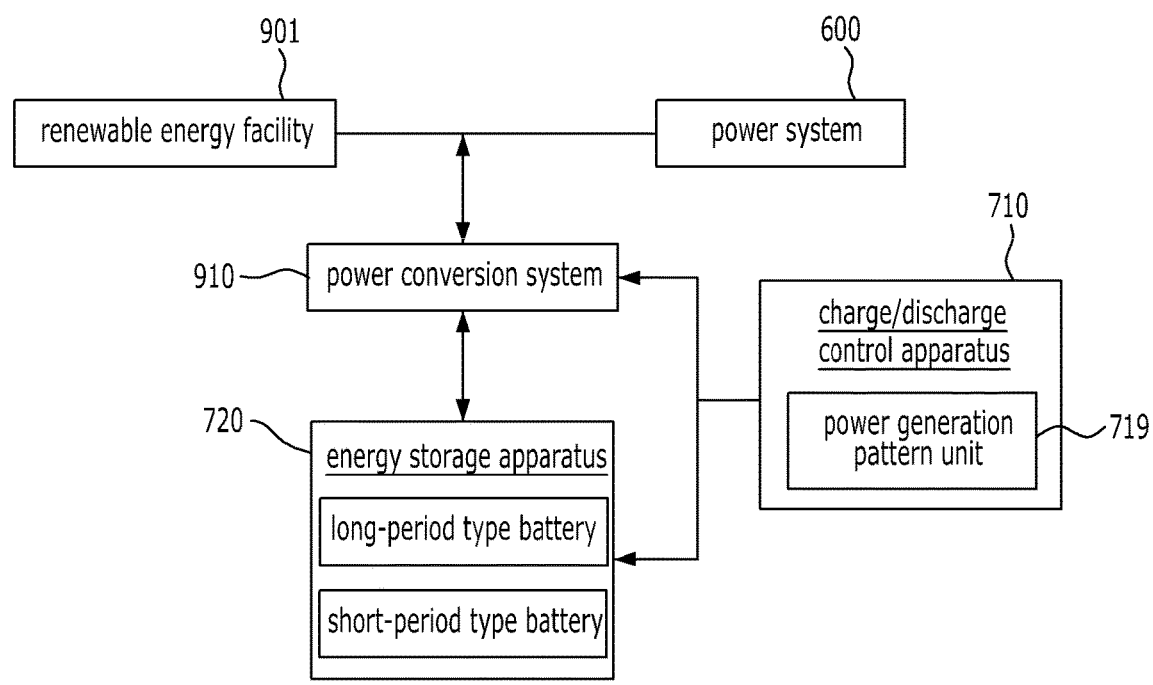
FIG. 15 is a schematic diagram showing a configuration of an energy management system according to another variation of the present disclosure.

FIG. 15 shows the configuration of an energy management system according to another embodiment of the present disclosure.

Referring to FIG. 15, the energy management system may include a renewable energy facility 901, a power conversion system 910, an energy storage apparatus 720, and a charge/discharge control apparatus 710.

The renewable energy facility 901 is a device that converts solar energy, wind energy, marine energy, or bio energy into electrical energy to produce and output power. For example, when the renewable energy generation facility is a solar energy facility, the solar energy facility includes a plurality of solar cell modules for converting solar energy into electrical energy to produce power, and an inverter for converting direct current power generated from the solar cell modules into alternating current power.

The power conversion system (PCS) 910 converts an alternating current power or a direct current power output from the renewable energy facility 901 into the energy storage apparatus 720 to be easily supplied to the energy storage apparatus 720, and converts a direct current power discharged from the energy storage apparatus 720 into an alternating current power to be supplied to the power system 600.

The energy storage apparatus 720 may charge power provided from the power conversion system 910 into a given battery 723 under the control of the charge/discharge control apparatus 710 that will be described later, and discharge power charged into the battery 723 under the control of the charge/discharge control apparatus 710 to be supplied to power conversion system 910.

Here, the energy storage apparatus 720 may be at least two kinds of batteries or at least two rows of parallel-structured batteries. The two kinds of batteries may include a long-period type battery having a longer discharge period than the short-period type battery and a single-phase type battery having a shorter discharge period than the long-period type battery.

Since the charge/discharge control apparatus 710 has been described in detail with reference to FIGS. 11 to 14, the description thereof is omitted but applied to this variation. This variation further includes a power generation pattern unit 719.

The power generation pattern unit 719 may predict a power generation pattern of power produced by the renewable energy facility 901 using a predefined demand prediction technique. Here, the demand prediction technique may be at least one of an artificial intelligence prediction algorithm (prediction technique), a statistical technique, and a Delphi technique described referring to FIGS. 11 to 14, but the present disclosure is not limited thereto.

Further using the power generation pattern unit 719, the power demand prediction unit 711 and the operation schedule update unit 718 described referring to FIGS. 11 to 14 may specifically re-establish and re-update the charge/discharge operation schedule, by allowing power generation pattern predicted by the power generation pattern unit 719 to be corresponded to the charge/discharge operation schedules described referring to FIGS. 11 to 14.

Accordingly, the charge/discharge control apparatus 710 controls at least one of the power conversion system 910, the energy storage apparatus 720, and the power system 600 according to the updated charge/discharge operation schedule considering the power generation pattern of the renewable energy facility 901, thereby enabling management of more precise charge/discharge operation.

While the present disclosure has been described in connection, it is evident to apparent to those skilled in the art that the present disclosure may be embodied in other forms without departing from the technical spirit or essential characteristics thereof.

Therefore, the variations described above are merely illustrative and are not intended to limit the scope of the present disclosure to the foregoing variations. It is to be understood that the flowcharts shown in the drawings are only illustrative steps for achieving the most desirable results in the practice of the present disclosure, and that other steps may be added or some steps may be deleted.

The scope of the present disclosure will be defined by the appended claims, but all changes or modifications derived from the claims, as well as those derived from equivalents thereof, are also within the scope of the present disclosure.

What is claimed is:

1. A power demand prediction apparatus for predicting power demand of a consumer having an electrical connection to a power system and an energy storage system, the apparatus comprising a processor configured to perform functions of:

collecting weather data and data on power used by the consumer;

selecting data points according to a preset condition from among the collected weather data based on a specific time span for which power demand is to be predicted;

generating long term prediction data for the power demand in the specific time span based on the selected data points;

analyzing a power usage pattern immediately before the specific time span and comparing the power usage pattern with the generated long-term prediction data, to determine whether correction of the long-term prediction data is required;

correcting the long-term prediction data based on the analyzed power usage pattern when it is determined that the correction is required;

generating a charge schedule and a discharge schedule in order to respectively control a charging and a discharging of an energy storage apparatus of the energy storage system during the specific time span, wherein, based on the comparison of the power usage pattern with the generated long-term prediction data, the power demand prediction apparatus outputs one of the long-term prediction data and the corrected long-term prediction data to a charge/discharge control apparatus of the energy storage system in order to control the charging/discharge of the energy storage apparatus of the energy storage system during the specific time span, and wherein the energy storage apparatus includes a battery and is configured according to the predicted power demand to be charged using power from the power system and to discharge the power to the consumer by obtaining a value of $P_L$ satisfying $$P_B = \Sigma(P_a(n) - P_L)$$

where $P_B$ is an amount of power charged into the battery, $P_a(n)$ is the predicted power demand at each time span, and $P_L$ is an amount of power input from the system, wherein a discharge power $P_o(n)$ at each time span is obtained using $$P_o(n) = \max(0, P_a(n) - P_L)$$

where the max(A, B) is a function of selecting a larger value of A and B; and respectively controlling the charging of the battery according to the charge schedule and controlling the discharging of the battery according to the discharge schedule.

2. The apparatus according to claim 1, wherein the processor is further configured to perform functions of:

setting a weight for each selected data point; and generating the long-term prediction data using a weighted average based on the selected data, in which the weighted average is obtained by dividing a sum of values, obtained by multiplying each data point and the weight set for each data point on all the data, by a sum of the weights set for all data.

3. The apparatus according to claim 2, wherein the processor is further configured to perform functions of:

calculating a difference between a temperature at the specific time span and a temperature at the time of collecting each selected data point and arranging the selected data points based on the difference, setting the weight only for a predetermined number of selected data points having the smallest temperature difference from the temperature at the specific time span among the arranged data points, and generating the long-term prediction data by obtaining a weighted average of the predetermined number of selected data points having the smallest temperature difference from the temperature at the specific time span.

4. The apparatus according to claim 3, wherein the weight is set for each selected data point based on a difference between a year corresponding to the specific time span and a year when the selected data is collected.

5. The apparatus according to claim 4, wherein the weight is set as 1 when the difference is zero, the weight is set as 0.9 when the difference is one year, the weight is set as 0.8 when the difference is two years, the weight is set as 0.7 when the difference is three years, the weight is set as 0.6 when the difference is four years, and the weight is set as 0.5 when the difference is five years.

6. The apparatus according to claim 1,
wherein correction of the long-term prediction data is determined to be unnecessary when a line connecting two used power amounts collected at two points of time earlier than the specific time span and a line connecting two long-term prediction power demand amounts at the same point of time generated by the long-term prediction data generation unit cross each other, and
wherein correction of the long-term prediction data is determined to be necessary when the lines do not cross each other.

7. The apparatus according to claim 1, wherein the collected weather data includes temperature data and used power data that is collected at fifteen-minute intervals.

8. The apparatus according to claim 1, wherein the preset condition is based on a past date, the past date being at least one of
a date falling during a time span of fifteen days before and after a date corresponding to the specific time span, and
a date similar in type to a date corresponding to the specific time span, in which the type is one of a holiday, a weekend, a weekday, or a date falling between a holiday and another non-working day.

9. A charge/discharge control apparatus for controlling charge/discharge of a battery of an energy storage system connected to a power system, the apparatus comprising a processor configured to perform functions of:
predicting power demand required by a consumer in at least one time span;
setting a charge time range when the battery is charged and a discharge time range when the battery is discharged;
scheduling an amount of power to be supplied for charging the battery for each time span of the charge time range;
scheduling an amount of power to be discharged from the battery for each time span of the discharge time range, the discharged amount of power obtained by obtaining a value of $P_L$ satisfying $$P_B = \Sigma(P_a(n) - P_L)$$

where $P_B$ is an amount of power charged into the battery, $P_a(n)$ is the predicted power demand at each time span, and $P_L$ is an amount of power input from the system, wherein a discharge power $P_o(n)$ at each time span is obtained using $$P_o(n) = \max(0, P_a(n) - P_L)$$

where the max(A, B) is a function of selecting a larger value of A and B; and
respectively controlling the charging of the battery according to the scheduled amount of power to be supplied for charging the battery and controlling the discharging of the battery according to the scheduled amount of power to be discharged from the battery.

10. The apparatus according to claim 9, wherein the amount of power to be supplied for charging the battery for each time span of the charge time range is constant.

11. The apparatus according to claim 9, wherein all the power charged into the battery is discharged in the discharge time range.

12. A charge/discharge control apparatus, the apparatus comprising a processor configured to perform functions of:
predicting power demand of a consumer within a specific period based on past power usage data of the consumer;
establishing a charge/discharge operation schedule of an energy storage apparatus for a day according to the predicted power demand and manages the energy storage apparatus according to the charge/discharge operation schedule, the energy storage apparatus including a first row of parallel structured batteries including a long-period type battery and a second row of parallel structured batteries including a short-period type battery, the long-period type battery of the first row having a longer discharge period than the short-period type battery of the second row;
comparing the predicted power demand with an actual load of the consumer to correct the predicted power demand when there is a difference of a predefined size; and
updating the charge/discharge operation schedule based on the corrected power demand and a charge/discharge state of each of the long-period type battery and the short-period type battery of the energy storage apparatus,
wherein the charge/discharge operation schedule of the energy storage apparatus includes a discharge schedule for the day in which an amount of power is discharged from the energy storage apparatus for a plurality of time spans of the discharge schedule, the discharged amount of power obtained by obtaining a value of $P_L$ satisfying $$P_B = \Sigma(P_a(n) - P_L)$$

where $P_B$ is an amount of power charged into the battery, $P_a(n)$ is the predicted power demand at each time span, and $P_L$ is an amount of power input from the system, wherein a discharge power $P_o(n)$ at each time span is obtained using $$P_o(n) = \max(0, P_a(n) - P_L)$$

where the max(A, B) is a function of selecting a larger value of A and B.

13. The apparatus according to claim 12, wherein the power demand of the consumer is predicted using an artificial intelligence engine to predict the power demand of the consumer within the specific period via at least one of a prediction algorithm, a statistical technique, a Delphi technique of an artificial intelligence based on the past power usage data, a weather forecast pattern, and a consumer characteristic pattern.

14. The apparatus according to claim 12, wherein the processor is further configured to perform functions of:
creating the charge/discharge operation schedule of the energy storage apparatus for the day based on the predicted power demand; and
managing a charge/discharge operation of the energy storage apparatus on the day based on the created charge/discharge operation schedule.

15. The apparatus according to claim 14, wherein the charge/discharge operation of the energy storage apparatus is managed based on the updated charge/discharge operation schedule.

16. The apparatus according to claim 13, wherein the prediction algorithm includes at least one of a reinforcement learning algorithm, a supervised learning algorithm, and a non-supervised learning algorithm.

17. The apparatus according to claim 12, wherein the processor is further configured to perform functions of:
- receiving the actual load of the consumer from a corresponding power system; and
- correcting the predicted power demand when a difference between the predicted power demand and the actual load of the consumer exceeds a reference value.

18. The apparatus according to claim 12, wherein the comparing the predicted power demand with the actual load of the consumer and the updating the charge/discharge operation schedule are repeatedly performed every prescribed time interval.

* * * * *